Feb. 10, 1970  C. R. LAUGHLIN ET AL  3,495,260
POSITION LOCATION SYSTEM AND METHOD
Filed Jan. 30, 1968  5 Sheets-Sheet 1

OMEGA TRANSMITTED SIGNAL FORMAT

INVENTORS,
Charles R. Laughlin
Roger C. Hollenbaugh
BY
ATTORNEYS

BASEBAND SPECTRUM TRANSMITTED FROM EACH AIRCRAFT

*INVENTORS,*
Charles R. Laughlin
Roger C. Hollenbaugh

BY Carl Levy

*ATTORNEYS*

INVENTORS,
Charles R. Laughlin
Roger C. Hollenbaugh
ATTORNEYS

INVENTORS,
Charles R. Laughlin
Roger C. Hollenbaugh

ATTORNEYS

3,495,260
POSITION LOCATION SYSTEM AND METHOD
Charles R. Laughlin, Silver Spring, and Roger C. Hollenbaugh, Greenbelt, Md., assignors to the United States of America as represented by the Administrator of the National Aeronautics and Space Administration
Filed Jan. 30, 1968, Ser. No. 701,744
Int. Cl. G01s 5/12
U.S. Cl. 343—112          17 Claims

ABSTRACT OF THE DISCLOSURE

Disclosed are a system and method for position locating, deriving centralized air traffic control data and communicating via voice and digital signals between a multiplicity of remote aircraft including supersonic transports and a central station, as well as a peripheral ground station (or stations), through a synchronous satellite relay station. Side tone ranging patterns, as well as the digital and voice signals, are modulated on a carrier transmitted from the central station and received on all of the supersonic transports. Each aircraft communicates with the ground stations via a different frequency multiplexed spectrum. Supersonic transport position is derived from a computer at the central station and supplied to a local air traffic controller. Position is determined in response to variable phase information imposed on the side tones at the aircrafts, with a plurality of different side tone techniques being employed, and relayed back to the transports. Common to all of the side tone techniques is Doppler compensation for the supersonic transport velocity.

---

The invention described herein was made by employees of the United States Government and may be manufactured and used by or for the Government for governmental purposes without the payment of any royalties thereon or therefor.

The present invention relates generally to central air traffic control systems and methods wherein the position of moving objects is determined with side tone ranging techniques.

The development of the supersonic transport (SST), commercial aircraft capable of flying approximately 2,000 knots, results in aircraft location problems that do not generally exist in tracking subsonic aircraft traveling on the order of 600 knots. SST's flying transoceanic routes must be constantly apprised of the exact location of other SST's in proximity thereto if lane corridors of approximately 100 miles, as are now standard in subsonic transoceanic aircraft traffic control, are to be utilized or reduced. The requirement for positional data regarding adjacent aircraft is even more necessary for an SST because such an aircraft flying at 2,000 knots has a two to three minute separation relative to another aircraft 100 miles away, in contrast to a ten minute separation of aircrafts flying at 600 knots with the same displacement. Hence, with SST's there is a greater need for constant on board and centralized surveillance of adjacent aircraft to avoid midair collisons and mishaps than with transoceanic subsonic aircraft.

In accordance with the present invention, the position of vehicle, such as a transoceanic SST, is determined by a computer at a central ground location, supplied to a central air traffic controller having responsibility for that and adjacent aircraft, and transmitted to a number of adjacent vehicles in flight via a synchronous satellite positioned to relay signals between the vehicles and ground station. The position indicating signals returning from the aircraft are variable phase side tones modulated on a carrier generally having a frequency in the microwave region. Because a portion of the positional information is represented as the carrier frequency from each aircraft, it is a requirement of the present system and method that phase coherence be maintained between receiving and transmitting apparatus at the central station and on each of the SST's.

A problem in maintaining minimum bandwidth and phase coherence between apparatus maintained on the SST's and at the ground station is with regard to Doppler effect caused by a receiving object moving at a velocity of 2,000 knots. In particular, an SST flying at 2,000 knots produces a two-way frequency shift in excess of ±10 kilohertz (kHz.) on a 1.5 gigahertz (gHz.) carrier. To maintain minimum bandwidth and phase coherence between the SST and ground station equipment, therefore, it is necessary to compensate for Doppler effect resulting from the extremely high velocity of the SST in a manner without destroying phase coherence. Perhaps the most straightforward and obvious method for overcoming the problem caused by Doppler effect on the carrier frequency transmitted from the aircraft is to provide no compensation at all and allocate a bandwidth for each aircraft sufficient broad to include the maximum Doppler shift. With possible Doppler shift frequencies on the order of ±10 kHz., however, the bandwidth associated with each SST would be so great as to prevent efficient transmission between each aircraft and the ground station.

Another approach to the problem of Doppler shift on the carrier frequency derived from an SST is exact compensation, whereby the frequency transmitted from the aircraft is shifted by an ultrastable oscillator on the aircraft so that at all times the resultant frequency transmitted from the aircraft appears to be constant. Thereby, ground station and satellite receivers would always be tuned exactly to the same center frequency transmitted to and received from the aircraft; however, phase coherence between received and transmitted carriers would not be maintained since an independent oscillator must be inserted on each aircraft. Since phase coherence is necessary and an oscillator with the required stability could not be flown on each aircraft, it is not practical to compensate exactly for Doppler frequency shifts.

In accordance with an aspect of the present invention, a compromise is struck between exact Doppler frequency compensation and a system requiring an extremely wide bandwidth. The frequency of the carrier received on the aircraft is measured and compared with a reference to provide an indication of Doppler frequency shift. In response to the difference between the received and reference frequencies, one of a plurality of Doppler frequency ranges is selected and indicated by a digital signal that modulates the carrier transmitted from the aircraft. The difference between the boundary value of the selected range and the difference frequency is an offset of the apparent carrier frequency transmitted from the aircraft relative to the aircraft carrier frequency under static flight conditions. The ground station responds to the digital signal transmitted from the aircraft to supply the computer with an input used in one position finding technique, while simultaneously monitoring the carrier transmitted from the aircraft to provide a measure of the difference between the boundary value of the selected range and the actual carrier. Phase coherence between the aircraft and ground station is preserved without requiring a wide bandwidth in the link between them by tracking the carrier frequency and phase with a phase locked loop while avoiding the problems associated with exact Doppler compensation. To prevent oscillation of the carrier frequency between two boundary values, as the Doppler frequency shifts slightly about a boundary of a range value, hysteresis is provided in the aircraft Doppler compensation circuit indicating frequency range.

Several alternate and/or complementary approaches may be utilized for determining the position of each aircraft by using the side tone ranging techniques of the present invention. In accordance with one technique, described and claimed in the copending application of Laughlin et al., Ser. No. 701,679, entitled "Traffic Control System and Method," filed on the same date and having the same assignee as the present application, a very low frequency receiver is provided on each aircraft, which receiver is responsive to very low frequency, omega emissions from a plurality of separated ground based transmitters. In response to the very low frequency signals received on the aircraft, the carrier transmitted thereby is modulated with data indicative of the aircraft position relative to the omega transmitters. The central station responds to the modulation imposed on the aircraft carrier by the VLF signals received on the aircraft to indicate the aircraft position. The general technique utilized for this sideband approach is described fully, except for Doppler compensation, in the copending application of Laughlin, Jr. et al., commonly assigned with the present application filed on May 22, 1967, and bearing Ser. No. 641,431.

According to a second technique utilized for measuring the position of an aircraft also described and claimed in the Laughlin et al. application filed on an even date with the present application, the intersection point of three spheres, defining lines of position or spherical loci about predetermined fixed points, is calculated at a ground station in response to signals emitted from each aircraft. One of these spheres is defined as the distance of the aircraft from the center of the earth, as derived from the aircraft altimeter, the reading of which is transmitted as a digital signal to the ground station via the link including the synchronous satellite. The radius of the second sphere is defined as the line of position, i.e. range, between the aircraft and synchronous satellite, determined in response to the phase of side tone modulation imposed on the microwave carrier transmitted between the satellite and aircraft. The radius of the third sphere is defined as a line of position around a very low frequency transmitter, such as an omega transmitter, to which a very low frequency receiver on the aircraft is responsive.

The system utilizing a synchronous satellite as a fixed point requires only one very low frequency transmitter, and not a multiplicity of such transmitters as is employed by the technique relying upon omega. Greater accuracy with the second system relative to omega may also exist because the aircraft responds to the VLF transmitter closest or at the best geometrical location relative to the aircraft, whereby greater VLF signal-to-noise ratios or LOP intersection geometry is generally attained than with a system responsive to a plurality of relatively distant VLF transmitters. In addition, the satellite range can be determined more accurately with R.F. techniques than through VLF measurement, thereby decreasing one dimension of aircraft position error.

In accordance with the embodiment of the invention claimed herein, the requirement for a ground based VLF transmitter is completely obviated by calculating the velocity vector of the aircraft relative to a synchronous satellite. In particular, the aircraft to satellite range rate, i.e. velocity vector, is derived from a coarse Doppler measurement, made by the aircraft Doppler compensator, which measurement is transmitted back to the central station via a digital link. The exact aircraft carrier is determined at the central station in response to the digital signal and a measurement of the aircraft carrier frequency relative to a standard at the central station. In addition, indications of the aircraft velocity vector relative to the earth, as derived from accelerometers on the aircraft, and the range between the aircraft and the synchronous satellite, as derived from side tone techniques imposed on a microwave carrier, are transmitted from the aircraft to the ground station via the synchronous satellite. In response to the aircraft velocity vector relative to the earth, the computer at the ground station calculates what the range rate between the aircraft and the satellite should be for every position on a line of position defined by the aircraft distance from the center of the earth and the distance between the aircraft and satellite. The calculated range rate is compared with the measured range rate for every point on the line of position. Equality between the calculated and actual range rate values yields an indication of the aircraft position.

A further feature of the present invention is that the power (both total and per channel) and RMS phase deviation of the signal transmitted from the satellite to the aircrafts remains constant as the power from any of the ground stations communicating with the aircraft changes due, e.g., to atmospheric conditions. Thereby, the signal from the satellite does not change in characteristics and appears to be derived from a single source. Prior art attempts to maintain power derived from a satellite constant as a function of the number of stations transmitting data to the satellite have no been completely successful because they have been unable to effectively control transmitter power levels at the ground stations.

According to the present invention, a true linear transponder is attained by beating the signals received from the central and peripheral stations to be a frequency wherein one of the ground station frequencies is at baseband on the satellite. The composition baseband signal phase modulates a carrier transmitted from the satellite so that virtually all of the information is contained in the first order sideband transmitted from the satellite. Without beating to baseband, a true linear transponder is not attained because at I.F. the phase modulation process is merely an approximation. At baseband there is no approximation; instead the phase modulation process is completely accurate.

The RMS deviation of the phase modulation imposed on the carrier transmitted from the satellite remains constant as a function of total ground station power by measuring the baseband power received from all of the ground stations on the satellite. Since almost all of this baseband power is contained in frequency modulated subcarriers, the RMS amplitude of which is not a function of modulation, and these subcarriers remain present even in the absence of modulation, a coarse adjustment of ground station power controls RMS phase deviation. In response to the power level of the composite baseband signal on the satellite, the RMS amplitude of the baseband signal modulating the carrier transmitted from teh satellite is varied utilizing automatic gain control techniques. The total power reaching the satellite remains constant by providing an A.G.C. network for the transmitters at the central and peripheral ground stations. At the central station, the A.G.C. network responds to an indication of the A.G.C. signal derived on the satellite for phase modulation control, while power transmitted from each peripheral station is controlled by comparing the carrier power level from the central station and the local station. The indication of central station carrier power level is derived at the peripheral stations by monitoring the signal transmitted from the satellite to the aircrafts.

It is, accordingly, an object of the present invention to provide new and improved systems and methods for determining the position of a moving object.

Another object of the present invention is to provide a system for and method of calculating the position of an object in response to measurements representing the distance of the object between predetermined points on earth and in outer space.

A further object of the present invention is to provide a system and method for enabling the position of an aircraft to be determined without a relatively complex computer being included on the aircraft.

Another object of the present invention is to provide a new and improved system for enabling a plurality of relatively adjacent aircrafts flying transoceanic flights to be apprised of the position of each other and to have their relative position monitored at a central location.

It is another object of the present invention to provide a new and improved system and method for communicating between a ground station and a moving vehicle while providing, on the vehicle, Doppler compensation for the speed thereof.

The above and still further objects, features and advantages of the present invention will become apparent upon consideration of the following detailed description of several specific embodiments thereof, especially when taken in conjunction with the accompanying drawings, wherein.

The following detailed description is made assuming a system having one central control station and one other ground station. In addition, it is assumed that only three aircrafts are being monitored by a single synchronous satellite located midway between the European and North American land masses over the Atlantic Ocean. Also, it is assumed that only three VLF omega transmitters in the North Atlantic region are provided. It is to be understood, however, that in an operational system as many as nine secondary ground stations may be employed and that simultaneous communication with two hundred aircrafts is accomplished with one synchronous satellite while world-wide coverage is attained with at least three synchronous satellites suitably located over different segments of the global area. Also, in an operational, worldwide system, eight VLF omega transmitters are included.

Figure 1:
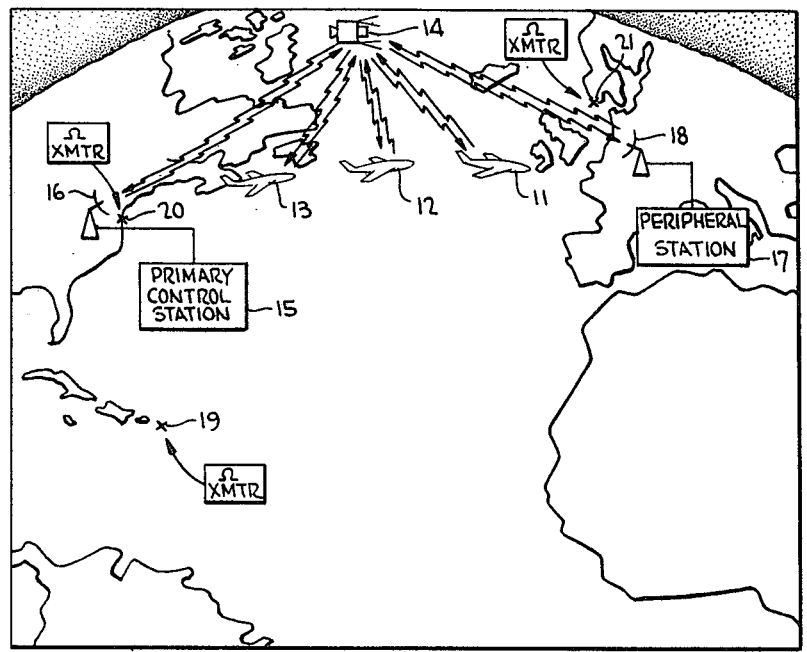
FIGURE 1 is a schematic diagram illustrating the principles of the present invention according to one embodiment.

Reference is now made to FIGURE 1 of the drawings, wherein there are illustrated three aircrafts 11–13 in transoceanic flights between the North American and European land masses. Synchronous satellite 14 is positioned at a relatively stationary point above the equator in central Atlantic Ocean, a subsatellite point, at an altitude of approximately 23,000 miles, whereby it has a rotational velocity equal to the rotational velocity of the earth. Located on the North American land mass is a primary control station 15 including microwave transmitter and receiver 16. On the European land mass is a second or peripheral station 17 including microwave transmitter and receiver 18. Secondary control station 17 is substantially the same as primary control station 15, except for power monitoring and control functions and apparatus at the primary station utilized for determining the position of aircrafts 11–13 is not operating at the secondary center although it may be available as a backup.

Two-way line of sight microwave transmission between ground stations 15 and 17 and synchronous satellite 14 is on a carrier frequency of approximately 5 gHz., while transmission between satellite 14 and each of aircrafts 11–13 is on a carrier in the aircraft allocation band of approximtely 1.5 gHz. Thereby, data are relayed between ground station 15 and 17 to aircrafts 11–13 via synchronous satellite 14 by frequency conversion from the C-band range to the L-band range. Ground stations 15 and 17 are also repsonsive to the L-band signal transmitted from satellite 14 whereby they can monitor the relative power as received on the satellite from all ground stations.

According to one embodiment of the present invention, the positions of aircrafts 11–13 are ascertained in response to VLF signals transmitted from omega stations 19–21 located at relatively widely separated points on the land mass illustrated by FIGURE 1. Omega transmitters 19–21 are very high power, VLF sources of electromagnetic energy, as described in detail in a publication entitled "Omega, A World-Wide Navigational System," published for the Omega Implementation Committee by Pickard and Burns Electronics, 103 Fourth Ave. Waltham, Mass. The very low frequency band between 10.2 and 13.6 kHz. was selected for omega transmission because complete global coverage by signals in such a frequency range is attained by employing only eight transmitting stations, each radiating ten kilowatts of power. This particular frequency band exhibits excellent propagation characteristics, allowing maximum coverage by each station, and has good phase stability, enabling sufficiently accurate measurements to derive positions of VLF receivers relative to the omega transmitters. The three omega stations 19–21 illustrated on the land mass of FIGURE 1, as well as a fourth omega station, located in the Hawaiian Islands, enable the position of an object receiving the VLF waves in the North Atlantic region illustrated to be accurately ascertained utilizing hyperbolic, isophase lines of position relative to the omega transmitters.

Figure 2:
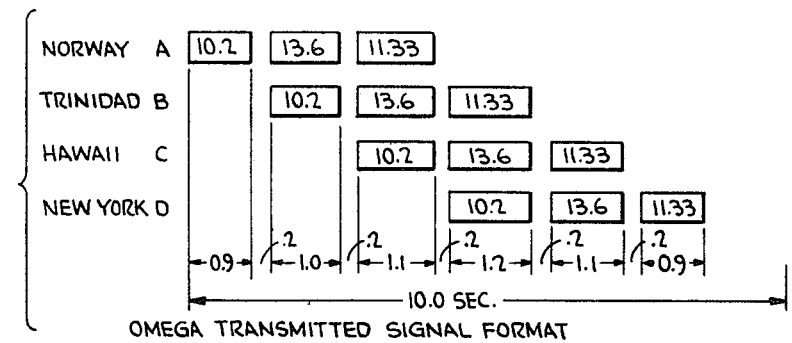
FIGURE 2 is a chart of the transmitting sequence and frequencies of the presently operational portion of the omega system.

The four mentioned omega transmission sites generate coherent VLF signals of 10.2, 11.33 and 13.6 kHz. in sequence in a maner indicated by the signal format chart of FIGURE 2. Sidebands of 11.3, 45.3 and 226 Hz. are respectively superimposed on the 10.2, 11.33 and 13.6 kHz. signals, whereby the location of a receiver can be determined uniquely within an area having sides of approximately 7,000 miles. A complete sequence of omega transmission resulting in full global coverage attained by eight omega transmitters requires ten seconds. Each sequence includes eight segments, each having a duration on the order of one second, with separations between adjacent transmission of 0.2 second. Because of the unique frequency and time relationship existing during each ten-second omega transmission format, identification of which station is transmitting a particular frequency is easily ascertained, as described in the previously mentioned omega publication.

Calculation of the position of an object utilizing omega techniques is made by comparing the relative phase of signals having the same frequency received on an object being tracked from a pair of transmitters. To provide a specific illustration, consider that aircraft 12 receives a 10.2 kHz. signal from station 21 with a phase of 45° relative to a 10.2 kHz. reference phase during the first 0.9 second of an omega transmission format. During a second transmission period, extending from 1.1 to 2.1 seconds after the beginning of the omega transmission format being considered, aircraft 12 receives the 10.2 kHz. signal derived from station 19 with a phase of −30° relative to the 10.2 kHz. reference. In response to the 75° phase difference between the signals received from stations 19 and 21, an isophase line, defined by the locus of points of a hyperbola with foci at stations 19 and 21, is derived. During a 1.1 seconds time interval extending from 2.3 to 3.4 seconds after the initiation of the omega format being considered, the 10.2 kHz. wave from the Hawaiian Islands omega transmission site is received on aircraft 12 with a phase of −145° relative to the reference 10.2 kHz. phase. In response to the 115° phase difference between the Hawaiian Islands signal and the signal from station 19, a second isophase line describes the position of aircraft 12. The intersectoin of the two isophase lines provides an indication of the position of aircraft 12.

Because the relative phase of the VLF transmissions from omega stations 19–21 is repetitive as a function of a distance from the station, it is necessary to utilize more than one VLF transmission frequency. By employing three VLF omega transmission frequencies of 10.2, 11.33 and 13.6 kHz., the position of an object carrying an omega VLF receiver can be resolved to an area having sides on the order of 75 miles. The side tones of 11.3, 45.3 and 226 Hz. enable resolution to regions having sides on the order of 7,000 miles.

In the present invention, VLF signals from the four mentioned omega transmission sites are received on each of aircrafts 11–13 to modulate the different L-band carriers transmitted from each aircraft to synchronous satellite 14. Synchronous satellite 14 responds to the three L-band carriers transmitted thereto, beats the modulation spectrums thereon to baseband relative to one of the carriers, and phase modulates the baseband spectrum on a C-band carrier transmitted to ground stations 15 and 17. Central ground station 15 responds to the omega modulation spectrums on the C-band carrier to derive information indicative of the positions of three aircrafts 11–13. Ground station 15 includes a VLF receiver to enable detected omega signals modulated on the microwave signal received thereby to be separated according to the station from which the VLF energy was transmitted. In response to the VLF and R.F. spectrums received at station 15, the positions of aircrafts 11–13 are determined at central station 15. The positional information is derived as a digital signal that modulates a subcarrier transmitted from central station 15 to satellite 14 on C-band. In addition, this positional information is supplied to a central air traffic controller who monitors all aircraft status and location. The satellite transponder converts the subcarrier data to L-band that is transmitted to aircrafts 11–13. The subcarrier is demodulated on each of aircrafts 11–13, whereby the relative position of each aircraft is known on the other aircrafts. With a large aircraft population only nearby aircraft location is relayed to a particular aircraft.

Figure 3:
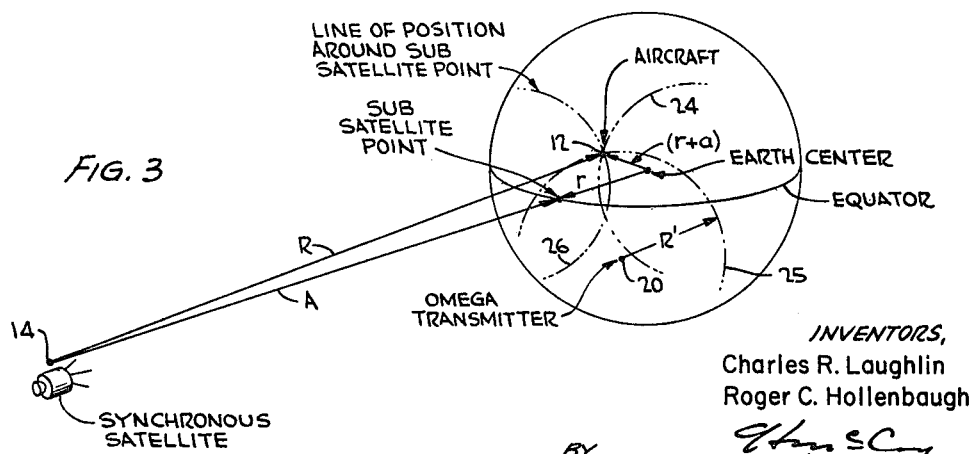
FIGURE 3 is a schematic diagram illustrating the principles of the present invention in accordance with a second embodiment, wherein VLF and R.F. side tones are employed.

According to an embodiment of the invention illustrated by FIGURE 3, which may be utilized to augment or replace the VLF omega position determining system, a single VLF source, such as transmitter 20, is utilized in conjunction with side tone, R.F. ranging techniques and altitude signals derived from aircrafts 11–13. In discussing the embodiment of FIGURE 3, to simplify the presentation, consideration will be given only to locating the position of aircraft 12, with the assumption that similar techniques are employed for ascertaining the positions of airchafts 11 and 13 and that data indicative of the location of all the aircrafts are relayed back to the aircrafts from ground station 15 and also supplied to the central controller. The position of aircraft 12 is determined utilizing a technique wherein the position of aircraft 12 is defined by the intersection of spheres 24 and 25 having radii respecively equal to: the distance between aircraft 12 and the center of the earth, as determined by the aircraft altimeter; the distance of aircraft 12 from omega transmitter 20. Spheres 24 and 25 have centers respectively coincident with the center of the earth and at VLF transmitter 20. The aircraft position is the intersection point of spheres 24 and 25 with line of position circle 26, having its center coincident with the subsatellite point and radius determined by the distance of aircraft 12 from satellite 14 and the aircraft altitude.

The distance of aircraft 12 from omega transmitter 20, along the surface of sphere 25, is determined with VLF isophase techniques somewhat similar to those employed in omega. The present technique differs from omega, however, since the position of aircraft 12 relative to VLF transmitter 20 is defined as a sphere, rather than as a hyperboloid. The locus of points is defined as a sphere because the isophase lines originate from a single VLF site and is determined by comparing the phase of the VLF signal with a reference phase of the same frequency. The phase of isophase line 25, on which aircraft 12 is located, is determined at central station 15 by modulating an L-band carrier transmitted from the aircraft with the VLF signal received on aircraft 12 and relaying the modulated signal to central station 15 via synchronous satellite 14. To provide a reference phase for the VLF signals received on aircraft 12, central station 15 includes a 10.2 kHz. source that modulates the C-band carrier fed to aircraft 12 via the R.F. link including satellite 14. The 10.2 kHz. reference phase received on aircraft 12 is transmitted from the aircraft back to ground station 15 via the synchronous satellite, together with modulation imposed by the 10.2 kHz. VLF signal from omega transmitter 20, enabling sphere 25 to be determined at the central station.

The radius of circle 26 is determined solely by utilizing R.F. side tone ranging techniques. A low frequency modulation side tone spectrum with frequencies on the same order of magnitude as the omega transmission frequencies, modulates the C-band carrier transmitted from central station 15 to aircraft 12 via satellite 14. The side tones are received on aircraft 12 and retransmitted back to central station 15, where they are compared with reference phase signals of the same frequency. In response to the phase difference between the received side tones at central station 15 and reference phase signals originating at the central station, the distance between aircraft 12 and satellite 14 is derived somewhat similarly to line of position 25. Since the distance between synchronous satelltie 14 and ground station 15 is also measured by side tone ranging techniques, the distance between the subsatellite point and aircraft 12 can be ascertained to define circle 26. A computer at the central station 15 responds to the phase indicating signals to solve three simultaneous equations representing the positions of lines 24–26 to determine the location of aircraft 12.

According to still a third embodiment of the invention, the position of aircraft 12 can be determined at central station 15 by utilizing R.F. side tone techniques, together with aircraft altimeter readings and aircraft velocity readings relative to satellite 14 and the earth. Range rate or velocity measurements of aircraft 12 relative to satellite 14 are made in response to Doppler frequency shift measurements made at the central control station on the airchaft carrier frequency, while the velocity measurements relative to earth are derived from accelerometers located on aircraft 12. The side tone technique utilized for measuring range between the satellite 14 and aircraft 12 is identical to that indicated supra with regard to FIGURE 3. All of the signals are relayed to central station 15, where the position of aircraft 12 is computed, monitored by the air traffic controller and transmitted back to the aircrafts in flight.

Figure 4:
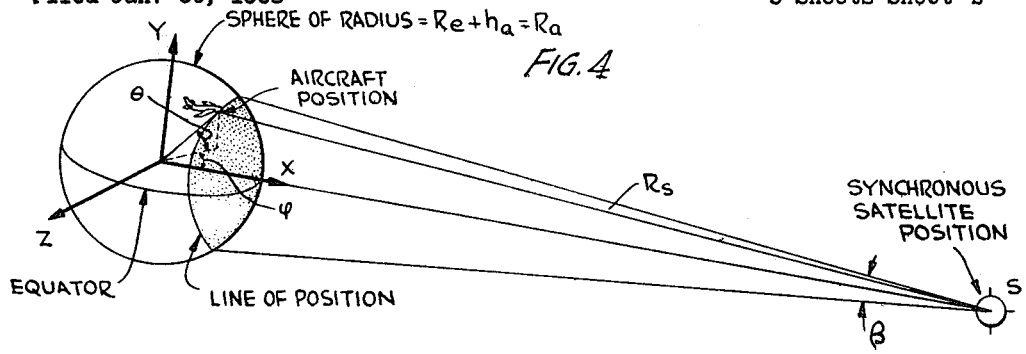
FIGURE 4 is a schematic diagram illustrating the principles of the present invention in accordance with another embodiment of the present invention wherein velocity vector of the object being located is employed.

To consider the geometrical principles involved in determining the location of aircraft 12 by utilizing velocity principles, reference is made to FIGURE 4 of the drawings. Basically, the technique involves calculating what the value of the range rate, $\dot{R}_s$, of aircraft 12 with respect to satellite 14 should be from the composite aircraft velocity vector, $\bar{V}$, for every position on a line of position defined by a sphere having its center at the satellite and of radius equal to the distance between satellite 14 and aircraft 12. Each of the calculated values of range rate is compared with the measured value of range rate, as determined from Doppler measurements made on the carrier frequency transmitted from aircraft 12. That position on the line of position wherein the calculated and measured values of range rate are equal provides an indication of the actual position of aircraft 12.

It can be shown that the velocity and positional data mentioned can be utilized to evolve equations:

$$|R_s|$$
$$=\sqrt{(R_a \cos \theta \cos \Phi - R_o)^2 + (R_a \cos \theta \cos \Phi)^2 + R_a \sin \theta)^2} \quad (1)$$

$$\dot{R}_s = \frac{1}{R_a}[(R_a \cos \theta \cos \Phi - R_o)V_x$$
$$+ (R_a \cos \theta \sin \Phi)V_y + (R_a \sin \theta)V_z] \quad (2)$$

where:

$R_s$ = aircraft to satellite range measured with R.F. side tones;
$\dot{R}_s$ = aircraft to satellite velocity measured with R.F. Doppler shift frequency;
$R_o$ = satellite distance from center of earth, derived from satellite position;
$V_x$, $V_y$ and $V_z$ are aircraft velocities relative to the center of earth measured with accelerometers;
$R_a$ = aircraft distance from the center of earth measured with an altimeter, i.e. $R_a = R_e + h_a$;
$\Phi$ = aircraft azimuth angle relative to fixed meridian on earth which the satellite is above;
$\theta$ = aircraft elevation angle with respect to equator of earth;
$R_e$ = radius of earth; and
$h_a$ = aircraft altimeter reading.

Equations 1 and 2 are simultaneous equations having as unknowns the azimuth $\Phi$ and elevation $\theta$ angles of aircraft 12 relatives to a spherical coordinate system having its center coincident with the center of the earth.

In the system described herein all three position location embodiments are described in a single unitary system, whereby checks are provided for each of the position location methods. In an actual system, any one or more of the position locating systems and methods may be employed depending upon the relative advantages of each. The embodiment utilizing a plurality of omega transmitters for position determination has at the present time the disadvantage of lacking worldwide coverage. In particular, the omega system has not now been completely implemented, as only four of the eight stations required for worldwide position determination have been established. The embodiment of FIGURE 3, utilizing VLF and R.F. side tone ranging techniques, has the advantage of not requiring a complete array of omega transmitters. The system of FIGURE 3, however, requires three VLF transmitters for worldwide coverage to provide adequate received signal strength at all points on the globe. At the present time, such VLF transmitters exist in the North Atlantic and mid Pacific areas, but none has been installed in the Far East or Indian Ocean region. The embodiment of FIGURE 4 has the distinct advantage of not requiring any VLF, ground based transmitters. The velocity responsive system of FIGURE 4, however, is subject to errors in calculation and resolution if the velocity of an aircraft being tracked is at right angles to the line of position defined by the distance between aircraft 12 and satellite 14. Hence, a system utilizing all three techniques for determining the position of an aircraft has the advantage of compensating for the difficulties of any one of them.

While three separate position locating systems and techniques are utilized virtually simultaneously in the present invention, the three systems have in common the feature of phase coherence between central station 15 and transceiving equipment contained on each of aircrafts 11–13. To achieve coherence between the central station 15 and each of aircrafts 11–13, signals derived from the aircraft must be phase locked with signals of reference phase at central station 15. Achieving phase lock between central station 15 and aircrafts 11–13 is a problem, however, since the 2,000 knot speed of the aircraft causes the L-band carrier received and transmitted from the aircrafts to be shifted in frequency by approximately 10,000 hertz. Because of the multiplicity of aircraft being tracked at any time from central station 15, such a shift in carrier frequency of the signal transmitted from one aircraft cannot be tolerated. Otherwise, the bandwidth required to track and communicate with 200 aircraft would be 4.2 mHz. greater than the bandwidth required to transmit voice and digital data between the aircraft and ground stations.

According to an aspect of the described system that is common to each of the three position keeping techniques, the Doppler shift frequency transmitted from the aircraft is compensated by limiting the carrier frequency Doppler shift transmitted from each aircraft to a relatively small band of, for example, ±0.8 kHz. If the Doppler shift exceeds ±0.8 kHz., the carrier frequency transmitted from the aircraft is shifted in discrete steps so that it remains within these boundaries. A digital indication of the number of steps is transmitted from aircraft 12 to station 15 by modulating a carrier with a low frequency binary signal, whereby the central station is appraised of the range of the frequency shift imposed by Doppler on the carrier transmitted from the aircraft. The actual value of the Doppler frequency within the given range is then determined at the central station by a measurement of the carrier frequency in the given aircraft channel.

Figure 5:
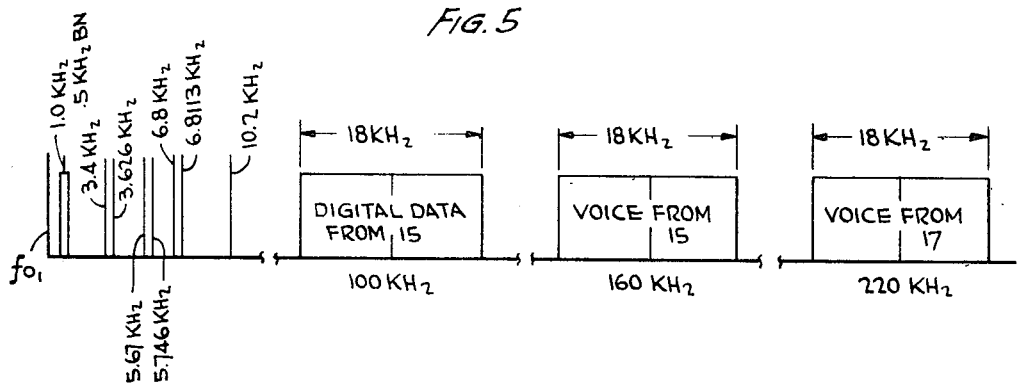
FIGURE 5 is a diagram of the spectrum transmitted from a central station and a peripheral station to the aircrafts.
Figure 6:
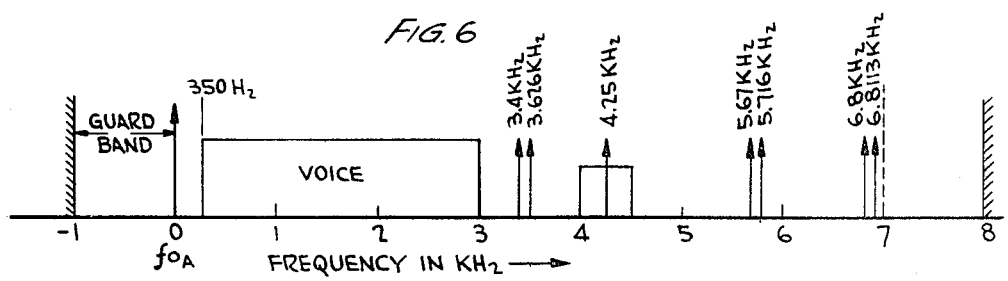
FIGURE 6 is a diagram of the spectrum transmitted from one of the aircrafts to the central station.

Consideration is now given to the spectrums transmitted from satellite 14 to aircrafts 11–13 and ground stations 15, 17 by referring to FIGURES 5 and 6. Considering FIGURE 5, the composite spectrum transmitted from satellite 14 to aircrafts 11–13 in response to signals from ground stations 15 and 17, a single carrier $f_{o1}$, at L-band has phase modulated thereon a baseband spectrum, including seven continuous tones, a digital timing and control signal and three frequency modulated subcarriers. The three subcarriers are displaced from each other 60 kHz., being located at 100 kHz., 160 kHz. and 220 kHz. from the carrier, with each being frequency modulated with a spectrum of 18 kHz. bandwidth. The subcarriers at 100 and 160 kHz. respectively carry digital and voice FM modulation originating from central station 15, while the subcarrier at 220 kHz. carries FM voice data originating from ground station 17. The displacement of the subcarrier frequencies is made on a preassigned basis, whereby the carrier for the voice signal originating from ground station 17 is displaced by a frequency of 220 kHz. from the carrier originating from central station 15, which relationship is maintained by station 17 monitoring satellite transmissions.

Baseband data on the $f_{o1}$ carrier, derived from signals generated at central station 15, are divided into a plurality of single audio frequency, coherent ranging side tones and a digital timing and control signal; the latter signal occupying a bandwidth of 500 hertz and being centered on a subcarrier of 1.0 kHz. All of the single frequency, single-sideband tones in the baseband are utilized for the position finding method described in conjunction with FIGURE 3. In particular, tones at 3.4, 5.67 and 6.8 kHz. enable the position of aircraft 11 to be ascertained utilizing phase comparison techniques. To increase resolution for the R.F. side tone range finding techniques, a second tone is provided for each of the three tones, with the second tones being respectively displaced from the 3.4, 5.67 and 6.8 kHz. tones by 226, 46.3 and 11.3 hertz. A 10.2 kHz. tone provides a reference phase on aircrafts 11–13 at the same frequency as one of the VLF frequencies, whereby the radius of sphere 25, FIGURE 3, can be ascertained.

The spectrum transmitted from each of aircrafts 11–13 to satellite 14, illustrated by the spectral diagram of FIGURE 6, has a carrier frequency $f_{oA}$ and a total bandwidth of 7 kHz. plus two 1 kHz. guard bands at either end of the spectrum. Carrier $f_{oA}$ has modulated thereon a single-sideband AM voice spectrum at baseband, extending between 350 and 3,000 hertz. Single-sideband ranging tones are established at the same relative frequencies in the baseband transmitted from each aircraft as is transmitted thereto, namely at frequencies of 3.4, 3.626, 5.67, 5.716, 6.8 and 6.8113 kHz. from $f_{oA}$. In addition, a subcarrier at 4.25 kHz. from $f_{oA}$ has modulated thereon digital data having a bandwidth of ±0.25 kHz. The digital data are indicative of parameters measured on the aircraft; examples of the parameters are Doppler frequency compensation, aircraft altitude and accelerometer readings.

The total actual bandwidth required for the spectrum of FIGURE 6 is on the order of 7 kHz. The bandwidth is extended to 9 kHz., by placing guard bands of 1 kHz. on either side of the spectrum. The guard bands are required to accommodate the ±0.8 kHz. Doppler frequency shift that can occur in the carrier $f_{oA}$ due to the Doppler compensation employed. If the compensation technique of the present invention were not utilized, the guard bands would extend 10 kHz. on either side of the spectrum.

The spectrums derived from each of aircrafts 11–13 have different, preassigned carrier frequencies relatively displaced from each other, by 9 kHz. whereby a complete spectrum is received at the satellite from each aircraft without overlap relative to other spectrums. The spectrums derived from aircrafts 11–13 are transmitted via L-band links to satellite 14, where they are detected and modulated on a single C-band carrier, with the same frequency separation as exists in their transmission to the satellite from the aircrafts. The C-band carrier is transmitted from satellite 14 to ground stations 15 and 17. Ground station 15 responds to all of the C-band data relayed from the satellite, while station 17 responds only to selected C-band voice data from aircrafts in proximity thereto and monitors the L-band carrier and relative power levels transmitted by the satellite for frequency and power control purposes.

Figure 7:
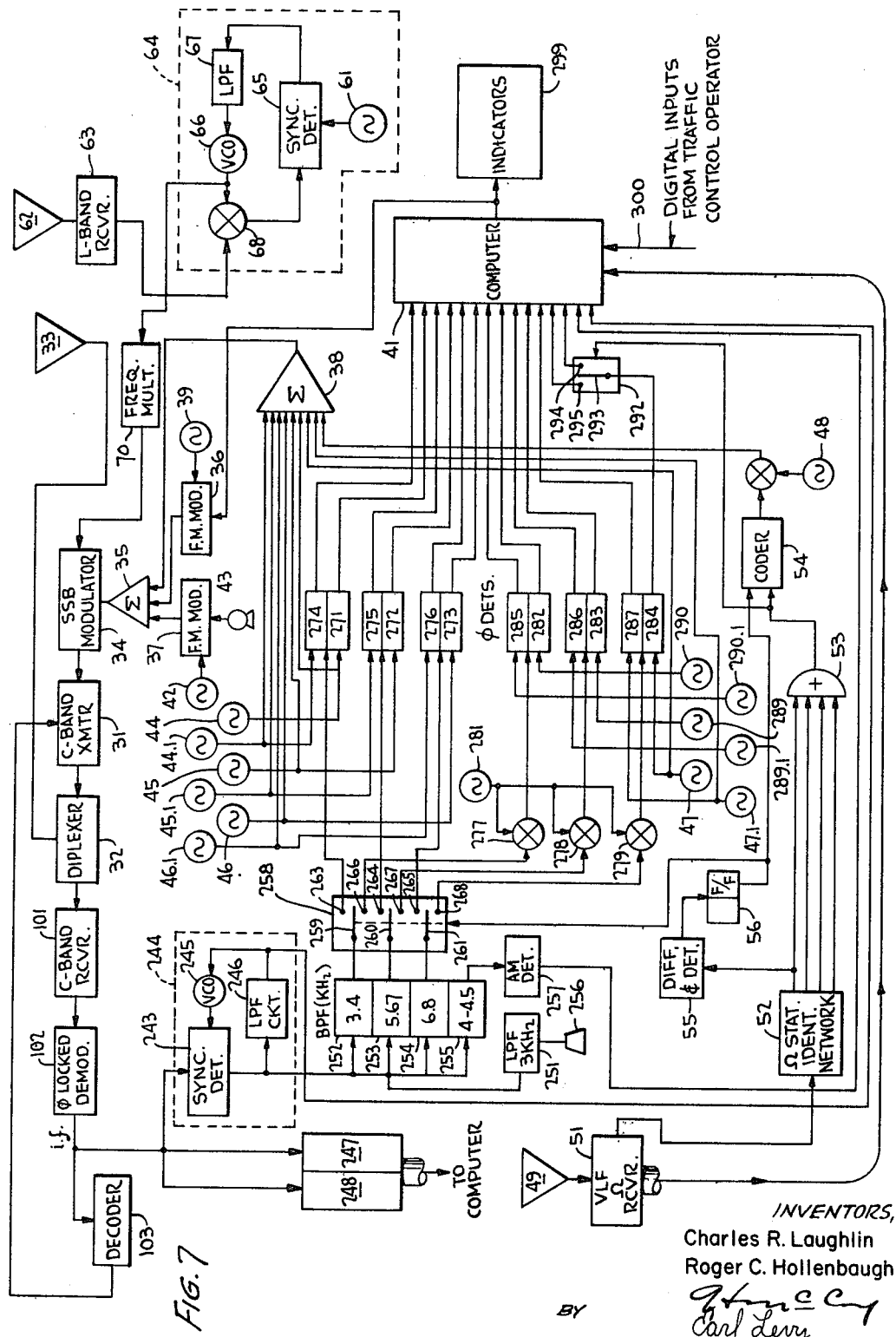
FIGURE 7 is a block diagram of the apparatus at the central station.
Figure 8:
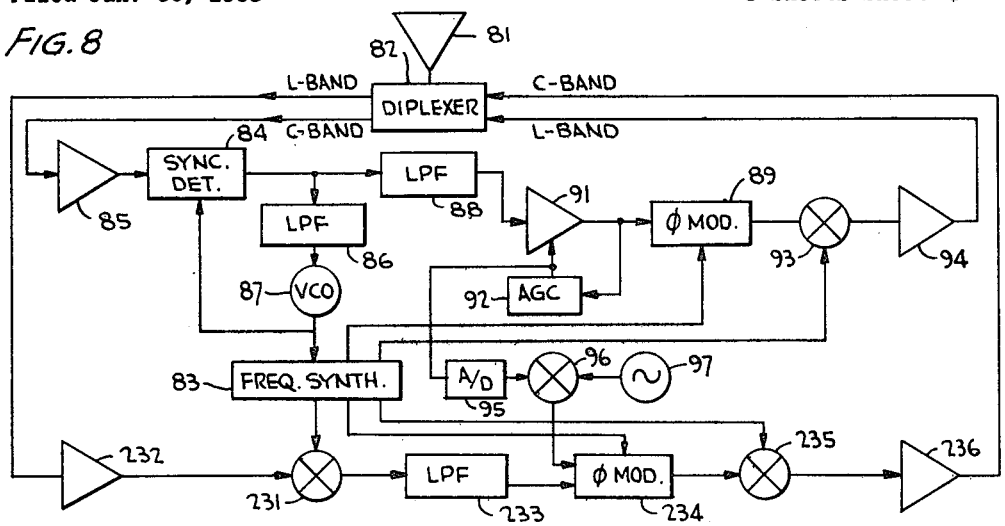
FIGURE 8 is a circuit diagram of the transponder apparatus on the satellite.
Figure 9:
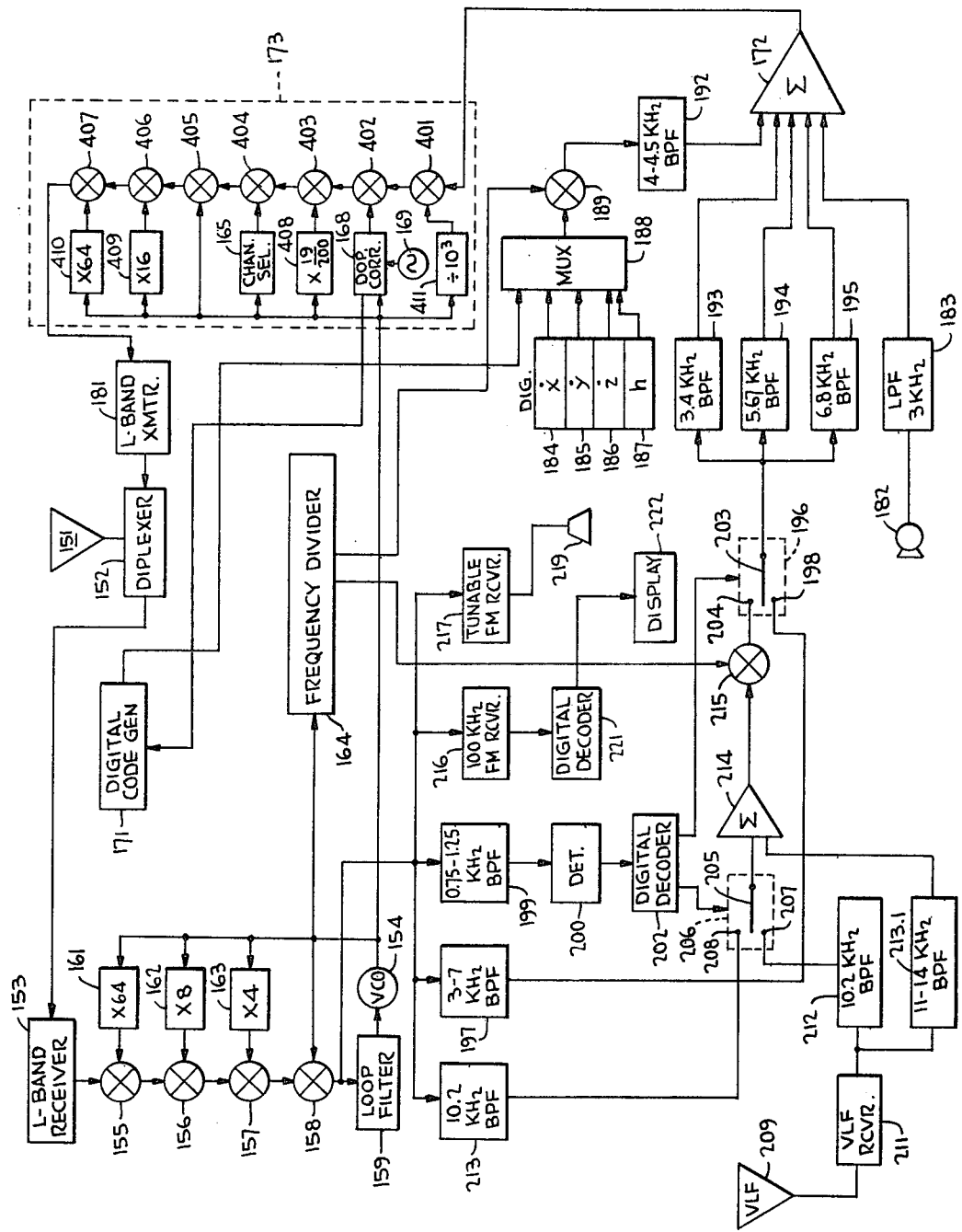
FIGURE 9 is a block diagram of the apparatus on one of the aircrafts.

Consideration is now given to the apparatus at central station 15, satellite 14, and on one of the aircrafts 11–13 by referring to FIGURES 7–9, respectively. Central station 15, illustrated by FIGURE 7, derives the spectrum indicated by FIGURE 5, except for the FM voice transmission on the 220 kHz. subcarrier, which is derived from peripheral station 17.

Central station 15 includes C-band transmitter 31 that couples microwave energy through diplexer 32 to C-band feed 33, which feed is coupled to a high gain dish (not shown). C-band transmitter 31 is responsive to the spectrum indicated by FIGURE 5, except for the voice band centered at 220 kHz., as derived from single-sideband modulator 34. Single-sideband modulator 34 is supplied with the spectrum by the output of summing amplifier 35, the inputs of which are responsive to summing amplifier 38 and FM modulators 36 and 37. FM modulator 36 includes a 100 kHz. subcarrier source 39 for modulating digital signals derived from computer 41, while modulator 37 includes a 160 kHz. subcarrier source 42 and is responsive to voice signals derived from an operator speaking into microphone 43. Each of modulators 36 and 37 includes a band pass filter for limiting the frequency excursion derived thereby to 18 kHz. FM modulator 37 has a modulation index of 2, thereby requiring an 18 kHz. bandwidth with a baseband spectrum up to 3 kHz.

Summing amplifier 38 feeds the remainder of the baseband spectrum of FIGURE 5 to amplifier 35. To this end, the inputs of summing amplifier 38 are responsive to continuous tones of 3.4, 3.626, 5.67, 5.716, 6.8 and 6.8113 kHz. respectively derived from sources 44, 44.1, 45, 45.1, 46 and 46.1. In addition, summing amplifier 38 includes an input carrying digital timing and control signals modulated on 1 kHz. subcarrier source 48.

The timing and control signals modulated on subcarrier source 48 are derived in response to the omega sequence, FIGURE 2, received at central station 15 by VLF antenna 49 and coupled to omega receiver 51. Omega receiver 51 supplies a signal to omega station identification network 52, of the type generally employed in all omega receivers, except for a 0.25 second delay in the input circuit thereof to compensate for the average round trip transmission time between station 15 and the aircrafts via satellite 14. Omega station identification receiver 52 derives four outputs, each respectively having a binary one level in response to a 10.2 kHz. signal being detected by receiver 51 from transmission of one of omega transmitters 19–21, or the transmitter located at the Hawaiian Islands.

The four signals derived from omega station identification network 52 are supplied to OR gate 53, the output of which is fed to digital coder 54. Digital coder 54 includes another input, to indicate the duration of alternate ten second omega formats. To this end, the output of omega station identification network 52, indicating the presence of 10.2 kHz. transmission from omega transmitter 19 at the beginning of each ten second format period, is coupled to the input of differentiating detecting network 55. Thereby, at the beginning of each omega format cycle, network 55 derives a short duration pulse that is coupled to the input of bistable multivibrator 56. The output of multivibrator 56, a square wave having a periodicity of 20 seconds, is coupled as the other input to coder 54. During alternate omega transmission formats, the outputs of flip-flop 56 are binary zero and one voltages. The binary zeroes and ones derived from flip-flop 56 and OR gate 53 are translated in coder 54 to digital signals utilized for controlling switches on aircrafts 11–13, as seen infra. The output of coder 54 is a sequence of binary bits, responsive to the status of the signals derived from flip-flop 56 and OR gate 53.

The carrier frequency supplied to single-sideband modulator 34 is derived from C-band frequency standard 61. The frequency received by the transponder on satellite 14 must appear to be constant, whereby the output of standard 61 cannot be supplied directly to modulator 34 because the synchronous satellite is subject to movement relative to the subsatellite point. The movement of satellite 14 with respect to the earth results in a Doppler shift of the carrier frequencies received thereby.

Compensation for the Doppler shift is attained in substantially the same manner at each of the ground stations by monitoring the L-band carrier frequency transmitted from satellite 14 to aircrafts 11–13. The L-band carrier is picked up at central station 15 by feed 62 that is coupled to L-band receiver 63. The $f_{o1}$ carrier frequency derived from L-band receiver 63 is compared with frequency standard 61 in phase locked loop 64 that comprises synchronous detector 65 responsive to the outputs of frequency standard 61 and the sum frequency output of mixer 68, derived by beating the outputs of voltage controlled oscillator 66 and L-band receiver 63. Synchronous detector 65 derives a spectrum including a D.C. voltage indicative of the frequency separation of the microwave signals applied thereto. The D.C. voltage is passed through low pass filter 67, to the exclusion of the remainder of the spectrum generated by detector 65, to control the frequency of voltage controlled oscillator 66. The output of voltage controlled oscillator 66, in addition to being heterodyned with the output of receiver 63 in mixer 68, is frequency multiplied in multiplier 70 to form a C-band carrier supplied to single-sideband modulator 34. The single-sideband modulated C-band carrier generated by modulator 34 is coupled to feed 33 via transmitter 31.

The C-band signal derived from transmitter 31 is relayed to satellite 14, the transponder circuitry of which is illustrated by FIGURE 8. Broadly, the satellite circuitry beats the energy transmitted to it from stations 15 and 17 to baseband for one of the C-band carriers, and phase modulates an L-band carrier of 1.54 gHz. with the baseband spectrums, while maintaining phase coherence by deriving the transmitted carrier from the received carrier. The modulation components are phase modulated on the 1.54 gHz. L-band carrier, with an RMS deviation of the one radian regardless of the total ground station power reaching the satellite. Thereby, the composite L-band signal transmitted from satellite 14 has the same RMS deviation regardless of the number of ground stations in operation and appears to be derived from a single source.

Phase coherence of the C-band and L-band signals respectively received and transmitted from satellite 14 via antenna 81 and diplexer 82 is attained by extracting the C-band carrier transmitted from the central station 15 and utilizing the carrier to control frequency synthesizer 83 at the satellite. The 5.1 gHz. carrier is removed from the modulation by feeding the C-band spectrum, as illustrated by FIGURE 5, to synchronous detector 84 through preamplifier 85. Synchronous detector 84 is connected in a phase locked loop with low pass filter 86 which supplies a D.C. signal to voltage controlled oscillator 87. Low pass filter 86 is designed to have a cut-off frequency of 500 hertz, whereby modulation on the 5.1 gHz. carrier, $f_{o1}$, does not control the frequency of oscillator 87. The output of oscillator 87 is fed in parallel paths back to synchronous detector 84 and to control frequencies derived from synthesizer 83.

The output of synchronous detector 84 is fed through low pass filter 88, having a cut-off frequency to enable the complete C-band spectrum derived from diplexer 82 to be derived. In the presently considered system, wherein a single central station and only one auxiliary station is included, the cut-off frequency of filter 88 is on the order of 250 kHz., enabling the complete spectrum of FIGURE 5 to be derived therefrom. Of course, for systems including several ground stations, the band pass of the filter 88 is adjusted as required.

The baseband spectrum derived from low pass filter 88 modulates a carrier frequency derived from synthesizer 83 in phase modulator 89. Phase modulator 89 responds to the spectrum derived from filter 88 via the path established through low level amplifier 91, having A.G.C. network 92 connected thereto. A.G.C. network 92 responds to the RMS power in the spectrum derived from the output of amplifier 91 to set the amplifier gain at a level to maintain the amplitude of the input signal to phase modulator 89 at a level wherein the phase modulation has an RMS deviation of one radian regardless of the ground station power reaching the satellite. To this end, the A.G.C. network effectively adds the power in the several spectrums, as illustrated by FIGURE 5, derived from amplifier 91. If, for example, only central station 15 were transmitting data to satellite 14 at full power and the power reaching the satellite from station 17 were reduced because, e.g., of atmospheric conditions, the voice spectrum centered at 220 kHz. would be attenuated relative to the power in the spectrum at 160 kHz. and the A.G.C. output voltage would be less than when the voice spectrum centered at 220 kHz. is being received at full power; in contrast, a relatively large A.G.C. signal is generated when power from both ground stations is received at the satellite without attenuation. In response to the low and high amplitude output signals of A.G.C. network 92 under the assumed conditions, the gain of amplifier 91 is respectively increased and decreased to achieve a one radian RMS phase deviation from phase modulator 89.

The phase modulated output signal of modulator 89 is shifted from the relatively low carrier frequency, applied to the modulator by synthesizer 83, to an L-band carrier of 1.54 gHz. by feeding the phase modulator output to a plurality of cascaded mixers, shown for simplicity as mixer 93. Mixer 93 responds to a relatively high frequency output of synthesizer 83 to derive a single-sideband L-band sum frequency signal. The signal derived from mixer 93 is fed through power amplifier 94 to diplexer 82 and transmitted from the satellite transponder via antenna 81. The L-band signal is received at ground stations 15 and 17 to control single-sideband modulator 34 thereat; at station 17 the L-band signal controls the C-band transmitter. Control of the C-band transmitter of central station 15 is in response to a digital signal derived on satellite 14 from the A.G.C. level applied to amplifier 92. To generate the digital indication the voltage from A.G.C. network 92 is fed to analog to digital converter 95, the output of which is modulated by mixer 96 on a 5 kHz. subcarrier derived from source 97. The subcarrier is phase modulated on a C-band carrier as seen in infra and transmitted to central ground station 15.

The power derived from central station 15 is controlled in response to the A.G.C. level at the satellite by coupling the received C-band carrier through diplexer 32 to phase locked demodulator loop 102 via C-band receiver 101. The I.F., A.M. output of demodulator 102 is applied to digital decoder 103, that derives a variable amplitude signal which is coupled to an A.G.C. input terminal of C-band transmitter 31. Thereby, the C-band power originating at station 15 is maintained within predetermined bounds and does not have a tendency to increase uncontrollably if the total ground station power reaching satellite 14 should decrease.

Figure 10:
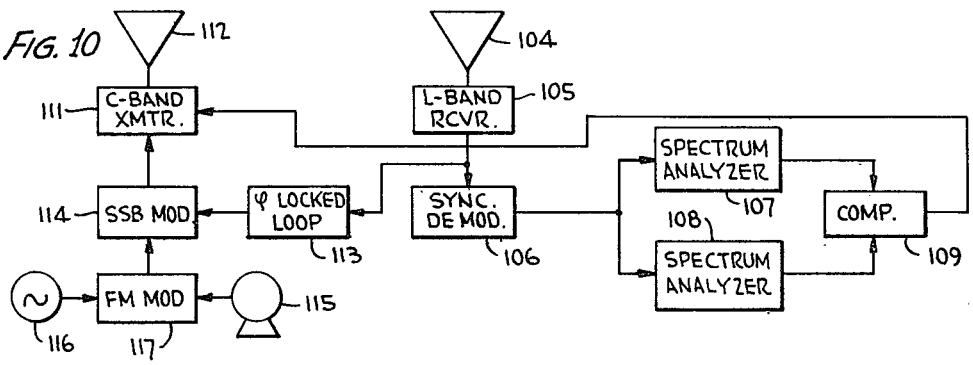
FIGURE 10 is a block diagram of the apparatus at a peripheral station.

To maintain the relative power fed to satellite 14 from peripheral station 17 constant with respect to the power reaching the satellite from station 15 and thereby enable the composite signal transmitted from the satellite to the aircrafts to be apparently derived from a single source, station 17 includes means to compare the relative power thereof and the central station reaching the satellite. To this end, peripheral station 17 includes L-band antenna feed 104, FIGURE 10, cascaded with L-band receiver 105. The signal generated by receiver 105 is coupled to synchronous demodulator 106, the output of which includes a pair of variable amplitude signals displaced by the frequencies of the signals transmitted from stations 15 and 17. The amplitudes of the signals from demodulator 106 are detected by spectrum analyzers 107 and 108, driven in parallel by the output of demodulator 106. The variable amplitude outputs of analyzers 107 and 108, respectively proportional to the relative amplitudes of the voice signals from stations 15 and 17 as received on satellite 14, are compared in comparison network 109. The signal derived from comparison network 109 is applied as the input to an A.G.C. terminal of C-band transmitter 111, the ouput of which is coupled to feed 112. Thereby, as the amplitude of the voice signal from station 17, reaching satellite 14, varies relative to the amplitude of voice signal from station 15, the power transmitted from the peripheral station is changed, whereby the amplitudes of the spectrums centered at 160 and 220 kHz., FIGURE 5, are maintained equal. Because of the demodulation-modulation process on satellite 14 which results in virtually all of the energy transmitted thereby being in the first sideband, detection of the amplitudes of the voice signals is attained with relatively simple band pass filter circuits in networks 107 and 108.

Control of the signal frequency transmitted from antenna feed 112 is with virtually the same apparatus as is employed in the network of FIGURE 7. In particular, phase locked loop 113 feeds a C-band carrier to single-sideband modulator 114 having a frequency to compensate for Doppler frequency shift of the satellite carrier due to satellite movement. The C-band carrier is heterodyned with a 18 kHz. bandwith FM voice signal modulated on 220 kHz. subcarrier source 116. The voice signal is derived from microphone 115 which feeds FM modulator 117, responsive to source 116, and is cascaded to single-sideband modulator 114.

The L-band signal derived from satellite 14 is also transmitted to each of aircrafts 11–13 with the baseband spectral format indicated by FIGURE 5. The 1.54 gHz. carrier transmitted from satellite 14 is received on each of aircrafts 11–13 by antenna 151, FIGURE 9, and fed through diplexer 152 to L-band receiver 153. Broadly, the receiving equipment included on each of aircrafts 11–13 phase demodulates the spectrum received thereby. The digital and voice data centered at 100, 160 and 220 kHz. are demodulated; the ranging tones are extracted and relayed back to central station 15. In addition, the timing and control signal on the 1.0 kHz. baseband subcarrier is detected to control the transmission of additional range tones from the aircrafts to central station 15. The transceiver on each of the aircrafts also determines the Doppler change on the L-band carrier received resulting from movement of the aircraft to compensate for Doppler frequency shifts.

The transmission of side tones from the aircrafts must be in phase coherence relative to the received side tones. To this end, L-band receiver 153 feeds the received phase modulated L-band carrier to a phase locked demodulator loop including voltage controlled oscillator 154, slaved to the frequency and phase of the received L-band carrier. Voltage controlled oscillator 154, having a nominal frequency on the order of 20 megahertz (mHz.), is controlled by a phase locked frequency division network including cascaded mixers 155–158 and low pass loop filter 159. From mixer 158 is derived a phase demodulated spectrum of the signal transmitted from satellite 14, which spectrum is a baseband replica of the spectrum illustrated by FIGURE 5 and includes a D.C. component indicative of the phase difference between the inputs to the mixer. The D.C. signal is coupled as a control input to oscillator 154 through loop filter 159, to the exclusion of the remainder of the received spectrum, to establish phase coherence between voltage controlled oscillator 154 and the 1.54 gHz. signal coupled to receiver 153.

To provide the frequency reduction necessary to beat the 1.54 gHz. carrier to baseband, the output of voltage controlled oscillator 154 is applied directly to mixer 158; while to mixers 155–157 the oscillator output is coupled through frequency multipliers 161–163, respectively having multiplication factors of 64, 8 and 4. The output of each of mixers 155–158 includes only the lower sideband spectrum of the two signals applied thereto.

The nominal 20 mHz. signal generated by oscillator 154 is applied to frequency divider 164 that derives separate outputs at 17 kHz. and at 4.25 kHz. In addition, the output of oscillator 154 is fed to up-frequency converter and modulator circuit 173 that derives a L-band carrier modulated by single-sideband data generated at the aircraft.

Circuit 173 comprises seven cascaded mixers 401–407, each responsive to a different multiple of the output of oscillator 154 and all, except mixer 401, responsive to the sum frequency derived from the preceding mixer. Mixer 401 responds to the baseband spectrum, indicated by FIGURE 6, derived from summing amplifier 172 and a 20 kHz. signal derived from divide by 1,000 frequency divider 411, fed by oscillator 154. The spectrum derived from mixer 401, on a 20 kHz. carrier, is modulated with a variable frequency wave generated by Doppler correction network 168 in mixer 402, the sum frequency output of which is applied to mixer 403. The output frequency of network 168 is variable in steps of 1.6 kHz. between 70.4 and 89.6 kHz., depending upon the velocity of the aircraft.

Up-frequency conversion and channel selection of the Doppler corrected carrier modulated by the spectrum, indicated by FIGURE 6 and derived from mixer 402, is via mixers 403–407. Mixer 404 is connected to oscillator 154 via presettable transmit channel selector frequency divider 165, while mixers 403, 405, 406 and 407 are driven by oscillator 154 with frequencies of 1.9, 20, 320 and 1,280 mHz. via frequency multipliers 408, 409 and 410, respectively having multiplication factors of 19/200, 16 and 64. Thereby, the output frequency of mixer 407 has a nominal L-band center frequency of 1.627 gHz., which is variable between 1.626 and 1.628 gHz., depending upon the selected channel.

Channel selector 165 is a frequency divider that decreases the frequency of oscillator 154 by a factor of 9K/20,000, where K=553, 554 and 555 for aircrafts 11, 12 and 13, respectively. In a practical system involving 200 aircrafts K is every integer between 445 and 644 on a preassigned basis, whereby the output frequencies of dividers 165 for the different aircrafts are relatively displaced 9 kHz. The 9 kHz. displacement establishes the 9 kHz. carrier separation transmitted from each of aircrafts 11–13 to prevent overlapping of spectrums as received at satellite 14. The 1.620 mHz. output of mixer 407 is applied to L-band transmitter 181 which feeds diplexer 152 and antenna 151.

Figure 11:
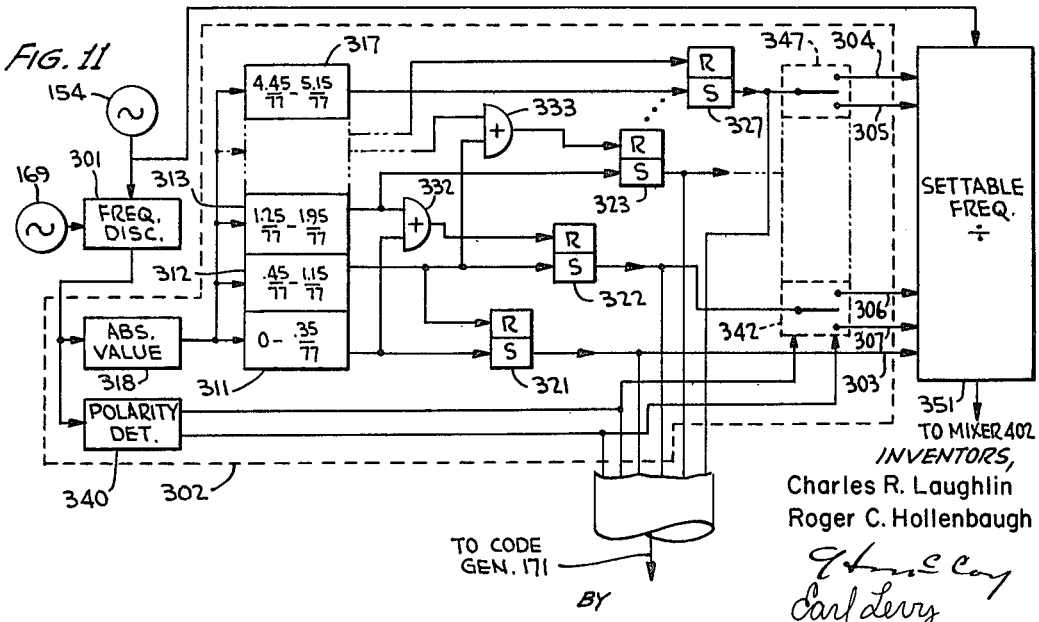
FIGURE 11 is a circuit diagram of the Doppler correction network utilized in the apparatus of FIGURE 9.

The details of Doppler correction network 168 are described infra in conjunction with FIGURE 11. In essence, network 168 includes circuitry responsive to a signal generated internally thereof such that the frequency transmitted from the aircraft appears to the transponder on satellite 14 to within ±0.8 kHz. of the boundaries of the preassigned aircraft carrier frequency, $f_{oA}$, regardless of the aircraft velocity relative to the satellite. As the Dopple shift imposed by the velocity of the aircraft on the carrier frequencies received and transmitted thereby exceeds the designated, predetermined carrier frequency by in excess of ±0.8 kHz. the transmitted carrier is returned in discrete steps to a frequency almost exactly equal to the designated carrier frequency.

Doppler correction network 168 measures the difference frequency between the outputs of oscillator 154 and reference source 169. In response to the difference in frequency between oscillators 154 and 169, the outputs of which may vary by as much as ±140 Hz. because of the velocity of aircraft 12 relative to satellite 14, network 168 derives a pair of outputs, coupled respectively to digital code generator 171 and mixer 402.

Network 168 has an output indicating the range of frequency coupled to mixer 402 in steps of 1.6 kHz. Network 168 includes means for establishing hysteresis in the range indications, whereby step transitions occur at a higher frequency as Doppler variations increase and at a lower frequency for decreasing Doppler variations. The hysteresis separations are on the order of 100 Hz. for the increasing and decreasing variations. Hysteresis is established for the range indication because the difference in frequencies applied to network 168 may vary slightly relative to each other about one of the range values. Hysteresis prevents such slight variations from being coupled as inputs to digital code generator 171 and mixer 402, whereby extremely large variations in the output of mixer 402 do not occur in both directions in a short time interval.

Each time a 1.6 kHz. Doppler frequency shift, either in the upward or downward direction, occurs a different signal is coupled by correction network 168 to digital code generator 171. Digital code generator 171 responds to the signal fed thereto by Doppler correction network 168 to derive a multi-bit binary word indicative of the net number of discrete Doppler shifts sensed by correction network 168. This Doppler compensation technique maintains coherence between transmitted and received carriers since no independent oscillator is coupled directly into the signal path.

Consideration is now given to the apparatus utilized for deriving the data signal derived from summing amplifier 172 indicated by the spectral diagram of FIGURE 6. The voice signal, occupying a baseband extending from approximately 350 to 3,000 Hz., is derived from microphone 182, connected to an input of summing amplifier 172 via band pass filter 183, having a cut-off frequency of 3 kHz. Digital signals indicative of the velocity of the aircraft in the three mutually orthogonal coordinate directions, $\dot{x}$, $\dot{y}$ and $\dot{z}$, as well as the aircraft altitude, $h_a$, are derived from four separate, digital transducers 184–187. The digital signals derived from transducers 184–187 and from digital code generator 171 are time division multiplexed through multiplexing switch 188 to an input of mixer 189, the other input of which is the 4.25 kHz. output from frequency divider 164. The entire band derived from mixer 189, extending from 4 to 4.5 kHz., is fed to one input of summing amplifier 172 via band pass filter 192, having upper and lower cut-off frequencies of 4 and 4.5 kHz., respectively.

Side tone ranging signals are applied to inputs of summing amplifier 172 via relatively high Q band pass filters 193–195, having center frequencies of 3.4, 5.67 and 6.8 kHz., respectively. The side tone signals are fed to filters 193–195 by a parallel connection of the filter inputs to an output of electronically controlled switch 196. Switch 196 is alternately responsive to side tone signals utilized in conjunction with the ranging technique involving only VLF, omega signals and the method employing both VLF and R.F. signals. Signals required for side tone ranging utilizing only R.F. techniques, as described in conjunction with FIGURE 4, may be fed through switch 196 during either interval.

The R.F. side tones in the band between three and seven kHz., as indicated by the spectral diagram of FIGURE 5, are derived at baseband from mixer 158 and fed through band pass filter 197, having lower and upper cut-off frequencies of 3 and 7 kHz., respectively. The side tone ranging spectrum derived from filter 197 is, therefore, continuously fed to terminal 198 of switch 196. Switch 196 is responsive to the timing and control signal centered at 1 kHz., as derived from mixer 158 and fed through 1.0 kHz. band pass filter 199, having cut-off frequencies of 0.75 and 1.25 kHz., to AM detector 200. The relatively low frequency binary signal generated by detector 200 is fed to digital decoder 202 which derives a bilevel signal to alternately connect armature 203 of switch 196 to contacts 204 and 198 every ten seconds. Thereby, the range tones at the output of band pass filter 197, derived from the R.F. carrier, are fed to summing amplifier 172 during alternate ten second periods. During the other ten second periods, when armature 203 engages contact 204, a spectrum is applied to band pass filters 193–195 indicative of VLF omega ranging tones.

During the first five seconds of every ten second period, digital decoder 202 responds to the output of detector 200 to connect armature or contact 205 of switch 206 to contact 207; during the remaining five seconds of each ten second interval, the decoder activates armature 205 to engage contact 208. Thereby, the four 10.2 kHz. VLF signals derived from VLF transmitters 11–13 and the Hawaiian Islands VLF transmitter, as received on the aircraft, are coupled to terminal 207 of switch 206 during the first five seconds of every ten second period. To feed the VLF omega signals to switches 196 and 206, each aircraft includes VLF receiving antenna 209, the output of which is coupled to VLF receiver 211 that feeds high Q band pass filter 212, having a center frequency of 10.2 kHz. During the remaining five seconds of each ten second period, the R.F. ranging tone at 10.2 kHz. is extracted from the spectrum derived from mixer 158 by way of the connection between high Q band pass filter 213, having a center frequency of 10.2 kHz., and contacts 205, 208.

Thereby, the signal derived from armature 205 of switch 206 is a series of five sequentially derived 10.2 kHz. tones during each ten second interval defining activation of switch 196, which ten second interval is coincident with the omega signal format indicated by FIGURE 2. The five sequentially derived signals at the output of switch 206 are of varying phase, depending upon the position of the aircraft relative to the four VLF transmitters and satellite 14. The phase of the signal derived from band pass filter 213 is considered as a reference phase relative to the phase of the tones derived in response to the VLF transmission because all of the side tones are transmitted back to ground station 15. At the ground station, the phase of the received 10.2 kHz. tone resulting from R.F. modulation is compared with the locally generated 10.2 kHz. signal and the difference enables the aircraft line of position 25 to be determined.

The remaining tones in the VLF spectrum received by antenna 209, indicated by the format diagram of FIGURE 2, are fed through band pass filter 213.1, having lower and upper cut-off frequencies of 11 and 14 kHz., to an input of summing amplifier 214, the other input of which is responsive to the signal at armature 205 of switch 206. The output of amplifier 214, a replica of the omega spectrum, and therefore a spectrum extending between 10 and 14 kHz., is fed to one input of mixer 215. Mixer 215 responds to the spectrum generated by summing amplifier 214 and the 17 kHz. output of frequency divider 164 to generate a difference frequency spectrum having components commensurate with the side tone ranging components fed to satellite 14 from central station 15. In particular, the 13.6, 11.33 and 10.2 kHz. components are translated to frequencies of 3.4, 5.67 and 6.8 kHz., respectively. Thereby, the same band pass filters 193–195 as are utilized for passing the side tones derived from band pass filter 197 can be employed for the side tones derived from summing amplifier 214 and the omega spectrum is decreased in frequency to reduce bandwidth requirements of the R.F. links between the aircraft and ground station.

To detect the digital and voice data in the spectrums centered at 100, 160 and 220 kHz., FM receivers 216 and 217 are connected to be responsive to the baseband signal generated by mixer 158. FM receiver 217 is manually tunable to be responsive to the voice signals centered at 160 and 220 kHz., as derived from central stations 15 and 17, to feed speaker 219. Thereby, voice communications between the aircraft and the area it is proximate are attained. FM receiver 216, having a center frequency of 100 kHz., derives an AM signal in response to digital data transmitted from ground, central station 15. The digital signals feed to digital decoder 221, the output of which is fed to a suitable display or indicator 222. The digital decoder 221 is a random access addressable channel common to all cooperating aircraft. Each aircraft has a unique address, with selections of the address being made at central station 15 in accordance with the relative positions of the several aircrafts. Thereby, each aircraft is apprised of information only of proximate aircrafts and not of remote aircrafts.

The L-band spectrums transmitted from each aircraft are transmitted to ground stations 15 and 17 via the transponder (FIGURE 8) of satellite 14, which beats them to baseband from an L-band reference, e.g. 1.620 gHz., then phase modulates the baseband spectrum onto a subcarrier and translates it up to a C-band carrier of 4.3 gHz. To this end, the L-band frequencies transmitted from the aircrafts are received by antenna 81 on satellite 14 and fed through diplexer 82 to a plurality of cascaded mixers, illustrated on FIGURE 8 as mixer 231, via preamplifier 232. The output of mixer 231 is a spectrum at baseband for the signal transmitted from one of the aircrafts 11–13 and a pair of spectrums having carriers displaced from baseband by amounts equal to the displacement in the carrier frequencies transmitted from the remaining aircrafts, as determined by channel selectors 165 included thereon. Beating the spectrum derived from preamplifier 232 back essentially to baseband is achieved by supplying an L-band reference derived from frequency synthesizer 83 as a second input to mixer 231 and feeding the mixer output through low pass filter 233, having a cut-off frequency adequate to pass the mixer lower sideband spectrum.

The outputs of low pass filter 233 and mixer 96, discused supra, are phase modulated with a reference frequency from synthesizer 83 in modulator 234. Phase modulator 234 is designed so that an r.m.s. phase deviation of 1 radian is imposed by the modulation spectrum derived from low pass filter 233 on the carrier generated by synthesizer 83. The need for an A.G.C. network for the input to phase modulator 234 does not generally exist because the number of aircrafts transmitting signals to the satellite is so large that fading in the signal from one aircraft does not have a relatively large effect on the total signal power fed to the phase modulator. Thereby, modulator 234 can be designed to provide the desired 1 radian r.m.s. phase modulation deviation. The phase modulated carrier derived from modulator 234 is up-frequency converted by a plurality of cascaded mixers, illustrated as mixer 235, the other input of which is responsive to an output of synthesizer 83. The sum frequency output of mixer 235, at a carrier frequency of 4.3 gHz., is fed to diplexer 82 and antenna 81 via power amplifier 236. The C-band signal transmitted from satellite 14 to ground stations 15 and 17 thereby comprises a carrier at 4.3 gHz. on which is modulated a plurality of spectrums, one being derived from each of aircrafts 11–13. The subcarriers of different spectrums are displaced from each other by approximately 9 kHz. to enable them to be separated at central station 15. As in the L-band transmission, the power in the C-band sidebands varies with the amplitude of the input signal applied to the phase modulator. The total power transmitted in each band remains relatively constant since the total power applied to modulators 89 and 234 is relatively constant regardless of the modulation amplitude received at the satellite.

Consideration is now given to the apparatus at central station 15 for separating the three spectrums derived from aircrafts 11–13 and to the complete system involved in processing one of the spectrums, FIGURE 7. The phase modulated C-band signal, received by antenna 33 and coupled through diplexer 32 to C-band receiver 101, is demodulated by phase locked loop 102 that derives an output commensurate with the spectrum generated at each of the aircrafts. The output comprises a frequency division multiplexed (FDM) composite spectrum, with the spectrum of each aircraft having a different subcarrier frequency, as indicated supra.

The composite spectrum output of demodulator 102 is fed in parallel to phase locked demodulators 244, 247 and 248. These phase locked demodulators are included because of the requirement for phase coherence between central station 15 and aircrafts 11–13 resulting from data being represented as a variable frequency of the aircraft subcarrier.

Phase locked loop 244, for example, includes synchronous detector 243, voltage controlled oscillator 245, and low pass filter circuit 246, connected and operating in the known manner. Synchronous detector 243 derives an output including: (1) a D.C. signal representing the phase difference between the signal from oscillator 245 and a predetermined subcarrier, and (2) the demodulated signal of the predetermined subcarrier. The D.C. signal is passed via low pass filter circuit 246 to control the frequency of oscillator 245. The signal from oscillator 245 is in turn coupled to synchronous detector 243 wherein the demodulation is performed. Low pass filter circuit 246 is designed to have a cut-off frequency of less than 1 kHz. so that none of the demodulated signal is coupled to oscillator 245.

Phase locked demodulators 247 and 248, substantially the same as demodulator 244, are driven in parallel by the output of demodulator 102. The voltage controlled oscillators of phase locked loops 247 and 248 have frequencies displaced from each other and from the voltage controlled oscillator 245 of loop 244 to demodulate the different subcarriers associated with the different aircrafts. The nominal frequency of the voltage controlled oscillator of each of phase locked loops 244, 247 and 248 is displaced in frequency by 9 kHz. to separate the three spectrums and beat them to baseband. From the baseband signal derived from loops 244, 247 and 248 are derived signals indicative of the spectrums transmitted from each of aircrafts 11–13. Because the circuitry for all of the information extracting networks is the same, a description of the network responsive to loop 244 is given to the exclusion of the other processing networks.

The demodulated baseband signal derived from phase locked loop 244, indicated by the spectral diagram of FIGURE 6, is separated into its constituent parts by low pass filter 251 and band pass filters 252–255. Low pass filter 251 has a cut-off frequency of 3 kHz., to derive the voice spectrum and feed speaker 256 with aural signals originating from microphone 182, FIGURE 9, on the aircraft. Each of band pass filters 252–254 is of the relatively high Q type to pass a pair of tones modulated on the carrier generated at the aircraft at frequencies of 3.4, 3.626, 5.67, 5.716, 6.8 and 6.8113 kHz.; band pass filter 255 is designed to pass the digital data in the 4–4.5 kHz. spectrum and has corresponding upper and lower cut-off frequencies.

The AM, sinusoidal output of filter 255 is converted to a binary pulse wave train by amplitude detector 257, the output of which comprises a plurality of sequentially derived binary words representing: the altitude of the aircraft, the velocity of the aircraft in the three coordinate directions relative to earth, the Doppler correction range inserted by networks 168 and 171 on the aircraft transceiver, timing signals and possibly other telemetry data. These digital signals are fed directly to an input of computer 41, together with the D.C. analog output of low pass filter 246, indicative of the frequency displacement of the carrier transmitted from the aircraft relative to the edge of the Doppler compensation range. Computer 41 responds to the analog output of filter 246 and converts it to a digital voltage, whereby a total indication of the Doppler correction inserted by the aircraft is attained by the computer by adding the two Doppler correction signals fed thereto. In response to the data fed thereto from filter 246 and detector 257, computer 41 is programmed to solve Equations 1 and 2, supra, after extracting satellite to aircraft distance, as determined from R.F. side tone ranging techniques. The altitude indication derived from AM detector 257 is also fed to and stored in computer 41 for determining aircraft position location in accordance with the embodiments of FIGURES 3 and 4.

Consideration is now given to the apparatus for extracting the side tone distance indication data from the phases of the signals derived from band pass filters 252–254, as is required to determine aircraft position location in accordance with each of the embodiments of FIGURES 1, 3 and 4. During alternate ten second VLF omega formats, indicated by FIGURE 2, the system determines range by responding first to the VLF signals and then to the R.F. ranging tone signals. Therefore, outputs of filters 252–254 are alternately fed to different processors, one processor for the VLF, omega signals, the other processor for the R.F. ranging tone signals.

To these ends, multiplexing switch 258 includes three input leads, one connected to the output of each of band pass filters 252–254, and three ganged armatures 259–261, the positions of which are determined by the binary signal derived from flip-flop 56. As is indicated supra, the output of flip-flop 56 is a square wave having a period of 20 seconds, with the leading and trailing edges of the wave occurring in synchronism with the beginning and end of each ten second omega format. In response to the binary level derived from flip-flop 56 being in a first state, armatures 259–261 are connected to contacts 263–265, respectively; the armatures engage contacts 266–268 in response to the output of flip-flop being in the second state. Armatures 259–261 are activated to the first named state while timing and control signals derived from coder 54 indicate that the system is in the R.F. side tone ranging mode; the switch is activated to its other condition with the sysem in the VLF ranging mode.

With armatures 259–261 engaging contacts 263–265, respectively, the baseband side tones derived from the R.F. side tones are applied to synchronous phase detectors 271–276. The variable phase, position indicating A.C. signals applied to detectors 271–273 from band pass filters 252–254 are compared in phase with signals of reference phase at frequencies of 3.4, 5.67 and 6.8 kHz. from sources 44–46, which sources are utilized for modulating single-sideband modulator 34 to derive the R.F. ranging tones originally transmitted from the central station 15, indicated by FIGURE 5. The D.C. output voltages of synchronous detectors 271–273 are, therefore, functions of the distance between ground station 15 and the aircraft selected by phase locked loop 244. The side tones at frequencies of 3.626, 5.716 and 6.8113 kHz. respectively coupled through band pass filters 252–254 are phase compared in phase detectors 274–276 with reference phase signals, at the identical frequencies, derived from sources 44.1–46.1. The relative phases of the signals derived from detectors 274–276, together with the phase indications generated by detectors 271–273, enable the position of the tracked aircraft to be determined without ambiguity in a region having sides on the order of 7,000 miles. The D.C. voltages derived from detectors 271–276 are fed to computer 41, which converts them into digital signals, stores the signals and utilizes them to solve equations for determining aircraft position in accordance with the embodiments described in conjunction with FIGURES 3 and 4.

During the other ten second omega format, armatures 259–261 respectively engage contacts 266–268 to enable omega, VLF phase differences to be detected for location solving in accordance with FIGURE 3. In addition, the phase of the 10.2 kHz. side tone modulated on the R.F. carrier, as received by the aircraft, is derived so that aircraft position in accordance with the embodiment of FIGURE 3 can be resolved. To convert the side tones modulated on the carrier transmitted from the aircraft at frequencies of 3.4, 3.626, 5.67, 5.716, 6.8 and 6.8113 kHz. back to frequencies of 13.6, 13.374, 11.33, 11.28, 10.2 and 10.19 kHz., contacts 266–268 are connected to mixers 277–279, respectively. Each of mixers 277–279 is driven in parallel by the output of 17 kHz. source 281 to derive a pair of difference frequency single-sideband signals equal in frequency to the VLF omega frequencies. The difference frequency outputs of mixers 277–279 are applied to phase detectors 282–287, which compare the phases of the 13.6, 13.374, 11.33, 11.28, 10.2 and 10.19 kHz. signals derived from mixers 277–279 with reference phase signals of the same frequency derived from sources 47, 47.1, 289, 289.1, 290 and 290.1, respectively. Thereby during every other omega transmission format, six signals are derived from phase detectors 282–287. These six signals are converted to digital indications by computer 41 which responds to them to ascertain the aircraft to omega station line of position of FIGURE 3.

Consideration is now given to the apparatus for establishing spherical line of position 25, FIGURE 3, about omega station 20 derived in response to the phase of the VLF signal received at aircraft 12 from station 20. To determine the phase of the VLF signal received at the aircraft with equipment located at station 15, a reference phase of 10.2 kHz. is transmitted from the station to the aircraft and relayed back to the station. The reference phase received at station 15 is compared to the reference phase originating at the station to indicate the phase displacement a 10.2 kHz. modulation tone suffers in transmission from the aircraft to the station. Knowing the phase displacement between the aircraft and station of the 10.2 kHz. modulation on an R.F. carrier, enables the phase of the 10.2 kHz. VLF signal received on the aircraft to be extracted since both the reference and VLF 10.2 kHz. tones modulate the same carrier over the same R.F. link. As indicated supra, coder 54 is activated in response to the output of OR gate 53 so that the 10.2 kHz. modulation from source 47 is relayed through aircraft 12 during the second half of alternate omega formats, at times when the aircraft is so far removed from any omega source that sufficient signal level of a 10.2 kHz. omega signal is not attained.

To extract the 10.2 kHz. phase reference data received at station 15 from the 10.2 kHz. omega signals, the D.C. output of phase detector 284 is sequentially coupled through armature 293 of switches 292 to contacts 294 and 295. To this end, the output of OR gate 53, a binary one level only during the first four time slots of each omega format, is coupled as a control signal to switch 292. During the first five seconds of each omega transmission, armature 293 of switch 292 is energized in response to the output of OR gate 53 so that it engages contact 294 and the phase of 10.2 kHz. VLF signal received on the aircraft is coupled into computer 41. During the remaining five seconds of each omega format, the armature of switch 292 is activated so that it engages contact 295 and the 10.2 kHz side tone modulated on the carrier transmitted from central station 15, as coupled back to the central station from the aircraft, is fed to the computer.

To enable the isophase characteristics derived from phase detectors 282–287 in accordance with the omega location mode of the invention to be separated, computer 41 is responsive to the output of VLF omega receiver 51. Receiver 51 derives signals indicative of which omega transmitter is generating a predetermined frequency at a certain time in a manner described in the omega implementation document. The manner in which computer 41 responds to the output of receiver 51 to separate the variable phase indicating outputs of detectors 282–287 and compute the aircraft position is known.

Computer 41 is programmed to determine the position of the aircraft in accordance with the embodiments of FIGURES 3 and 4. Since computer 41 is of the digital type, and does not function on a real time basis, the calculations made thereby are in response to signals occurring in different or overlapping time periods. For example, the computation for position location in accordance with the embodiment of FIGURE 1, utilizing VLF, omega isophase techniques, involves signals being received over a ten second period. Calculations based upon the embodiment of FIGURE 3 involve altitude of the aircraft as an input, which may be received simultaneously with or at a different time from the phase modulated, position indicating signals required for the techniques of FIGURES 3 and 4. In the technique involving FIGURE 3, the six phase indicating signals from detectors 282–287, derived in response to transmission received on aircraft 12 from transmitter 20, are combined with the altimeter reading of the aircraft, generated by detector 257, and the aircraft position relative to satellite 14, as indicated by the phase indicating outputs of detectors 271–276.

Computer 41 determines the aircraft position in accordance with the technique of FIGURE 4 by computing aircraft range from satellite 14 in response to the phase indications from detectors 271–276. The range rate, or velocity, of the aircraft relative to satellite 14 is determined in response to the Doppler frequency shift imposed by the aircraft on the carrier received and transmitted thereby derived at central station 15 in response to the outputs of low pass filter 246 and AM detector 257. The velocities of the aircraft relative to the earth in the three coordinate directions are determined from outputs of detector 257, as is the distance of the aircraft from the center of the earth. These velocity signals or velocity signals derived by computer 41 in accordance with a technique disclosed in the previously mentioned copending application S.N. 641,431 of Laughlin et al. are utilized by computer 41 to correct for errors in the frequencies of the side tones, as derived from detectors 271–276 and 282–287; such errors being due to Doppler frequency shift. The computer internally corrects for the Doppler frequency shift by combining digital indications of the signals generated by detectors 271–276 and 282–287 with the error calculated thereby.

Computer 41 responds to the signals applied thereto to provide three indications of the position of each aircraft being tracked. The computer output is fed to a bank of indicators, as a series of sequential binary words, and modulates 100 kHz. subcarrier source 39 applied to FM modulator 36. Air traffic controller personnel monitor the digital indications and in response thereto issue commands to the aircraft via a voice link through microphone 43 or, preferably, via digital signals fed to computer 41 via input 300. The digital signals are coupled through the computer to frequency modulate subcarrier source 39. The positional data regarding each aircraft derived from computer 41 and the digital signals on input 300 modulate the 100 kHz. subcarrier of source 39, whereby each of the aircrafts 11–13 has signals transmitted to it indicative of: the position thereof, the location of other proximate aircrafts and digital command data originating with the aircraft controller.

Consideration is now given to FIGURE 11, a circuit diagram of the Doppler frequency correction network employed on each of the aircrafts 11–13, a common feature for all of the position locating embodiments disclosed herein. Basically, the Doppler compensation circuit of FIGURE 11 compares the output frequency of voltage controlled oscillator 154 with a reference frequency of 20 mHz. derived from source 169. In response to the variable frequency output differing from the reference frequency by predetermined levels, variable frequency divider responsive to the voltage controlled oscillator output is activated, while signals are fed to digital code generator 171.

To these ends, the frequencies derived from oscillators 154 and 169 are supplied to frequency discriminator 301, the output of which is a D.C. voltage indicative of the magnitude and polarity of the departure of the voltage controlled oscillator output frequency from the frequency of source 169. The D.C. output voltage of discriminator 301 is supplied to amplitude detector 302, having 13 different output levels (only four of which are shown) to cover each of 13 different $$\pm \frac{400}{77}$$

hertz steps, the factor 77 being introduced by the down frequency conversion factors in the aircraft transceiver. Together, the thirteen output levels of detector 302 cover the possible $$\pm \frac{5 kHz}{77}$$

deviation between the frequencies of oscillators 154 and 169. Amplitude detector 302 is constructed so that an output is derived from lead 303 thereof when the frequencies of sources 154 and 169 deviate from each other by less than $$\pm \frac{0.4 \, kHz}{77}$$

For maximum deviations between the frequencies of sources 154 and 169 of $$\pm \frac{4.4}{77} \text{ to } \pm \frac{5.2}{77}$$

kHz., leads 304 and 305 are respectively activated, while leads 306 and 307 are energized in response to deviations between $$\pm \frac{0.4}{77} \text{ and } \pm \frac{1.2}{77} kHz$$

To attain a 100 Hz. hysteresis effect about each of the boundaries at the output of amplitude detector 302, the output of frequency discriminator 301 is fed in parallel to a bank of seven amplitude level detecting networks 311–317 (only four of which are shown) through absolute value network 318. Each of networks 311–317 derives a binary one output only when the input thereof lies within a different, predetermined non-overlapping amplitude range. The boundary values of the amplitude ranges to which each of detectors 311–317 is responsive are separated by 100/77 Hz. from a boundary value of the adjacent detector. For example, the ranges of detectors 311, 312 and 313 for frequency separations between sources 154 and 169 are respectively 0 to 0.35/77 kHz., 0.45/77 to 1.15/77 kHz., and 1.25/77 to 1.95/77 kHz.

The output of each of networks 311–317 is applied to the set input of a corresponding flip-flop 321–327 (only four of which are illustrated). The reset inputs of each of flip-flops 322–326 are derived from the outputs of the two amplitude detectors adjacent the detector feeding that particular flip-flop set input through OR gates 332–336 (only two of which are illustrated). In contrast, the reset inputs for flip-flops 321 and 327 are respectively derived only in response to the outputs of amplitude detectors 312 and 316.

In operation, each of flip-flops 321–327 is initially activated to the reset state. Flip-flop 321 is energized to the set state as the aircraft is warmed up on the ground in response to the binary one output derived from network 311 that results from the zero level output of frequency discriminator 301. As the aircraft moves, the output voltages of discriminator 301 and network 318 increase in amplitude until the maximum level of detector 311 is exceeded and a binary zero is applied to the set input of flip-flop 321. Flip-flop 321, however, remains activated to the set state and a binary one is still generated thereby on output lead 303 since the flip-flop reset input has not been activated.

Thereby, flip-flop 321 remains energized until the aircraft velocity results in an output voltage from discriminator 301 commensurate with a frequency deviation between sources 154 and 169 equal to 0.45/77 kHz. At such a velocity, a binary one output is derived from detector 312, causing flip-flops 321 and 322 to be respectively reset and set. Flip-flop 322 remains in the set status even if the frequency departure between sources 154 and 169 drops below 0.45/77 kHz., as long as it does not reach 0.35/77 kHz. Thereby, a hysteresis effect is achieved between the set outputs of flip-flops 321 and 322. In a similar manner, hysteresis effects are attained between the set outputs of the other flip-flops 323–327.

The direction of the relative frequency change between sources 154 and 169 is determined with amplitude polarity detector 340, connected to be responsive to the output of frequency discriminator 301. Detector 340 includes two outputs, on each of which is respectively generated a positive voltage in response to positive or negative output voltages of frequency discriminator 301. The outputs of detector 340 are applied in parallel as control inputs to polar, electronic switches 342–347 (illustrated for simplicity as mechanical switches and only two of which are shown). Switches 342–347 respond to the control voltages of detector 340 to selectively feed the outputs of flip-flops 321–327 to one of two output leads. Thereby, if the output voltage of discriminator 301 is positive, leads 304 and 305 are respectively connected with the outputs of flip-flops 327 and 322, while leads 305 and 307 are connected to the flip-flop outputs in response to a negative output voltage from discriminator 301.

The outputs of amplitude comparator 302 are applied in parallel to digital coder 171, FIGURE 9, and settable frequency divider 351 which selectively reduces the frequency of source 154. Settable frequency divider 351 is a counting chain wherein stages are inserted and removed at will in response to activation of the output leads of comparator 302. The frequency division factor of counter 351 on the output frequency of oscillator 154 is expressed as $N/12{,}500$, wherein N is selectively any integer between 44 and 56. Thereby, the output frequency of divider 351 is variable between 70.4 and 89.6 kHz. in setups of 1,600 Hz., depending upon which one of the output leads of comparator 302 is energized. If the Doppler frequency shift resulting from the velocity of the aircraft is less than $$\pm \frac{400}{77}$$

hertz relative to source 169, resulting in a binary one on lead 303, N=50 and the output frequency of divider 351 is 80 kHz. As indicated supra, the hysteresis effect prevents large shifts in the output frequency of divider 351 if slight variations occur in the difference of the frequencies applied to detector 301 relative to one of the boundaries of comparator 302. Thereby, noise or slight aircraft velocity changes about a range boundary value do not result in repeated shifts in the frequency transmitted from the aircraft and coherence is more readily maintained.

The manner by which the Doppler compensation affects the frequencies received at the aircraft and transmitted therefrom is derived from the following analytical approach. If the satellite transmitter carrier frequency to the aircraft is $f_{TS}$, the carrier frequency received at the aircraft ($f_{RA}$) varies with range rate ($R_S$) as follows:

$$f_{RA} = f_{TS}\left(1 + \frac{\dot{R}_s}{C}\right) \quad (3)$$

where C is the speed of light. The carrier frequency transmitted by the aircraft ($f_{TA}$) to the satellite after Doppler compensation of D is:

$$f_{TA} = f_{RA}\left(\frac{M-D}{K}\right) = f_{TS}\left(\frac{M-D}{K}\right)\left(1 + \frac{\dot{R}_s}{C}\right) \quad (4)$$

where:

M=the factor of up-frequency multiplication of the 20 mHz. output of oscillator 154 to the input of transmitter 181; and
K=the factor of down-frequency division of the output of receiver 103 to oscillator 154.

The carrier frequency received at the satellite ($f_{RS}$) from the aircraft is:

$$f_{RS} = f_{TA}\left(1 + \frac{\dot{R}_s}{C}\right) \quad (5)$$

Substituting Equation 4 into Equation 5, yields:

$$f_{RS} = f_{TS}\left(\frac{M-D}{K}\right)\left(1 + \frac{\dot{R}_s}{C}\right)^2 \quad (6)$$

Equation 6 may be approximated with a binomial expansion as:

$$f_{RS} \doteq f_{TS}\left(\frac{M-D}{K}\right)\left(1 + \frac{2\dot{R}_s}{C}\right) \quad (7)$$

Without Doppler compensation at the aircraft (i.e. D=0 in Equation 7) the carrier frequency received by the satellite from the aircraft would be:

$$f_{RS} \doteq f_{TS}\left(\frac{M}{K}\right)\left(1 + \frac{2\dot{R}_s}{C}\right) \quad (8)$$

Ideally, for $\dot{R}_s = 0$, the carrier frequency received at the satellite from the aircraft is:

$$f_{RS} = f_{TS}\left(\frac{M}{K}\right) \quad (9)$$

To receive $f_{RS}$ (the desired frequency) of Equation 9 on the satellite, $f_{RS}$ in Equations 7 and 9 must be equal.

Accordingly, by simplifying terms the following equation is derived:

$$-f_{TS}\frac{D}{K}\left(1 + 2\frac{\dot{R}_s}{C}\right) + 2\frac{M}{K}\frac{\dot{R}_s}{C}f_{TS} = 0 \quad (10)$$

The expressions of Equation 10 can be defined as:

$$f_g \doteq f_{TS}\frac{D}{K}\left(1 + 2\frac{\dot{R}_s}{C}\right) \quad (11)$$

and $$f_D \doteq 2\frac{M}{K}\frac{\dot{R}_s}{C}f_{TS} \quad (12)$$

where:

$f_g$ is the Doppler compensation on the aircraft, and
$f_D$ is the uncompensated Doppler on the satellite.

Solving Equation 10 for D yields:

$$D\left(1 + \frac{2\dot{R}_s}{C}\right) = 2M\frac{\dot{R}_s}{C}$$

$$D = \frac{2M\dot{R}_s}{C + 2\dot{R}_s} \doteq 2M\frac{\dot{R}_s}{C} \quad (13)$$

The value of Doppler frequency, $f_a$, seen at the satellite after Doppler compensation, is:

$$f_a = f_d + f_g \doteq \left(\frac{2M\dot{R}_s}{C} - D\right)\frac{f_{TS}}{K} \quad (14)$$

Although Equation 13 indicates that D varies directly with $\dot{R}_s$, in the Doppler compensation technique described supra in connection with FIGURES 9 and 11, D actually assumes a discrete value for each of a plurality of predetermined ranges of $\dot{R}_s$. For this reason, $f_a$ is some finite value except at the mid-point of each predetermined range $\dot{R}_s$, at which points $f_a = 0$. In the discussion of FIGURES 9 and 11 a guard band of $\pm 1$ kHz. for each aircraft was assumed, thereby constraining $f_a$ in Equation 14 to the limits of $\pm 1$ kHz. With the value of $f_a$ being chosen as $\pm 1$ kHz., the ranges of $R_s$ are determined. Each of these ranges requires a different discrete value of D for $f_a$ of Equation 14 to equal 0 at the mid-point of that range.

By utilizing the compensation technique described, a system involving communications to 200 aircraft, each having a channel bandwidth of 7 kHz. and a guard band of $\pm 1$ kHz., the total bandwidth for the guard bands is 0.4 mHz. In contrast, if no compensation of the type employed in the present invention were utilized, a bandwidth of 4.2 mHz. would be required for the 200 guard bands. Thereby a bandwidth saving in excess of 1,000% is attained in a practical system employing 200 aircraft.

While we have described and illustrated several specific embodiments of our invention, it will be clear that variations in the details of the embodiments specifically illustrated and described may be made without departing from the true spirit and scope of the invention as defined in the appended claims.

We claim:

1. A method of determining the position of a moving object comprising transmitting an R.F. carrier modulated with a side tone spectrum from a predetermined point to the object via a synchronous satellite relay station, receiving the carrier relayed from the satellite on the object, determining from the phase of the tones in the spectrum received on the object relative to a reference tone the distance of the object from the satellite, measuring the Doppler frequency shift on the carrier received by the object to provide a determination of the velocity of the object relative to the satellite, determining on the object the velocity vector of the object relative to a predetermined point on earth, determining on the object the distance of the object from the center of the earth, and combining the determined parameters to indicate the object position.

2. The method of claim 1 further including the step of transmitting an R.F. carrier modulated with said spectrums, as received on the object, and data indicative of said determinations from the object to a central station, and performing said determinations at the central station in response to the spectrums received thereat.

3. The method of claim 1 further including the step of transmitting an R.F. carrier modulated with said spectrum, as received on the object, and data indicative of said determinations from the object to the point, and performing said determinations at the point, and performing said determinations at the point in response to the spectrums received thereat.

4. The method of claim 3, wherein said object is moving to Doppler shift the effective carrier frequency transmitted from the object, compensating on the object for the Doppler shift by: comparing the received carrier frequency with a reference frequency, and shifting the transmitted carrier frequency by discrete steps in response to the received frequency differing from the reference frequency by predetermined steps so that the apparent frequency of the transmitted carrier received at the first point always lies within a boundary equal to the frequency spread of one half of one of the steps.

5. In a method of determining the position of a moving object comprising the steps of transmitting from a station a wave having side tones enabling distance determinations to be made modulated thereon, receiving the modulated wave on the object, from the phase of the side tones in the received wave determining a line of position of the object relative to the station, determining the velocity vector of the object, and combining the line of position and velocity vector determinations to enable the location of the object to be determined.

6. In a method of determining the position of a moving object comprising the steps of transmitting from a station a wave having side tones enabling distance determinations to be made modulated thereon, receiving the modulated wave on the object, from the phase of the side tones in the received wave determining a line of position of the object relative to the station, determining the velocity vectors of the object relative to points in space and on earth, and combining the line of position and both velocity vector determinations to enable the location of the object to be determined.

7. A system for enabling the position of a moving object to be determined comprising a station for transmitting a first wave having side tones modulated thereon; said object including a transceiver having: means for receiving said first wave, means responsive to the received first wave for deriving a second wave having modulated thereon the side tones modulated on the received first wave, the side tones of the second wave being phase coherent with side tones of the received first wave, and means for transmitting said second wave; said station further including: means for receiving the second wave, means responsive to the side tones modulated on the received second wave for deriving a signal indicative of a line of position of the object, means for deriving a signal indicative of the velocity of the object, and means for combining said signals.

8. The system of claim 7 wherein said station includes means for deriving another signal indicative of the distance of the object from the center of the earth, and said means for combining being responsive to said another signal.

9. The system of claim 7 wherein the transceiver includes means for compensating for Doppler frequency shift imposed on the waves transmitted to and from the transceiver, said Doppler compensating means comprising: an oscillator deriving a variable frequency in response to the frequency of the received wave, means for coupling the oscillator variable frequency to said transmitter means for the second wave transmitted from the transceiver, means for measuring the Doppler shift frequency of the first wave transmitted to the receiver, said coupling means including means responsive to the measured shift frequency for maintaining the second wave transmitted from the transceiver within a finite range defined as a predetermined Doppler shift frequency regardless of the Doppler shift frequency.

10. A system for enabling the position of a moving object to be determined comprising a station for transmitting a first wave having side tones modulated thereon; said object including means for deriving a first signal indicative of the velocity of the object, and a transceiver having: means for receiving said first wave, means responsive to the received first wave for deriving a second wave having modulated thereon the side tones modulated on the received first wave and said first signal, the side tones of the second wave being phase coherent with side tones of the received first wave, and means for transmitting said second wave; said station further including: means for receiving the second wave, means responsive to the side tones modulated on the received second wave for deriving a second signal indicative of a line of position of the object, means for detecting the first signal modulated on the received second wave, and means for combining said second and detected signals.

11. The system of claim 10 wherein: said object further includes means for deriving another signal indicative of the distance of the object from the center of the earth; said transceiver includes means for modulating said another signal on the second wave; said station includes means for detecting said another signal; and said combining means is responsive to the detected another signal.

12. The system of claim 10 wherein the transceiver includes means for deriving said first signal in response to the Doppler shift frequency of the first received wave.

13. The system of claim 10 is further including inertial means on the object for deriving said first signal as an indication of the velocity of the object relative to a point on earth.

14. A system for enabling the position of a moving object to be determined comprising a station for transmitting a first wave having side tones modulated thereon; said object including a transceiver having: means for receiving said first wave, means responsive to the received first wave for deriving a second wave having modulated thereon the side tones modulated on the received first wave, the side tones of the second wave being phase coherent with the side tones of the received first wave, and means for transmitting said second wave; said station further including: means for receiving the second wave, means responsive to the side tones modulated on the received second wave for deriving a first signal indicative of a line of position of the object, means for deriving second and third signals respectively indicative of the velocities of the object relative to a point in space and a point on earth, and means for combining said first, second and third signals.

15. The system of claim 14 wherein said station includes means for deriving another signal indicative of the distance of the object from the center of the earth, and said means for combining being responsive to said another signal.

16. A system for enabling the position of a moving object to be determined comprising a station for transmitting a first wave having side tones modulated thereon; said object including means for deriving first and second signals respectively indicative of the velocities of the object relative to a point in space and a point on earth and a transceiver having: means for receiving said first wave, means responsive to the received first wave for deriving a second wave having modulated thereon the side tones modulated on the received first wave and said first and second signals, the side tones of the second wave being phase coherent with side tones of the received first wave, and means for transmitting said second wave; said station further including: means for receiving the second wave, means responsive to the side tones modulated on the received second wave for deriving a third signal indicative of a line of position of the object, means for detecting the first and second signals modulated on the received second wave, and means for combining said third signal with both of said detected signals.

17. The system of claim 16 wherein: said object further includes means for deriving another signal indicative of the distance of the object from the center of the earth; said transceiver includes means for modulating said another signal on the second wave; said station includes means for detecting said another signal; and said combining means is responsive to the detected another signal.

References Cited

UNITED STATES PATENTS

| | | | |
|---|---|---|---|
| 3,317,909 | 5/1967 | Waetjen | 343—100 |
| 3,384,891 | 5/1968 | Anderson | 343—6.5 |

RODNEY B. BENNETT, JR., Primary Examiner

RICHARD E. BERGER, Assistant Examiner

U.S. Cl. X.R.

343—9, 6.5, 105

PO-1050
(5/69)

UNITED STATES PATENT OFFICE
CERTIFICATE OF CORRECTION

Patent No. 3,495,260　　　　　　　Dated February 10, 1970

Inventor(s) Charles R. Laughlin et al

It is certified that error appears in the above-identified patent and that said Letters Patent are hereby corrected as shown below:

Column 9, line 11, the equation should appear as follows:

$$= \sqrt{(R_a \cos \theta \cos \Phi - R_o)^2 + (R_a \cos \theta \sin \Phi)^2 + (R_a \sin \theta)^2}$$

SIGNED AND
SEALED
AUG 25 1970

(SEAL)
Attest:

Edward M. Fletcher, Jr.
Attesting Officer

WILLIAM E. SCHUYLER, JR.
Commissioner of Patents